United States Patent
DeLia et al.

(10) Patent No.: US 8,350,747 B2
(45) Date of Patent: *Jan. 8, 2013

(54) SURVEILLANCE WITH SUBJECT SCREENING

(75) Inventors: Paul DeLia, Croton-on-Hudson, NY (US); Scott T. Trosper, Meridian, ID (US); Thomas E. Breen, Winchester, MA (US); John J. Reilly, Waltham, MA (US); Paul J. Hurd, Norfolk, MA (US); Michael J. Lanzaro, North Reading, MA (US); Maya M. Radzinski, Palo Alto, CA (US); Thomas W. Grudkowski, Pleasanton, CA (US); Edward E. Bromberg, Orlando, FL (US); Joseph Carter, Los Gatos, CA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 1535 days.

This patent is subject to a terminal disclaimer.

(21) Appl. No.: 11/740,193

(22) Filed: Apr. 25, 2007

(65) Prior Publication Data

US 2012/0105267 A1    May 3, 2012

Related U.S. Application Data

(63) Continuation-in-part of application No. 11/679,106, filed on Feb. 26, 2007, now abandoned, which is a continuation of application No. 10/825,530, filed on Apr. 14, 2004, now Pat. No. 7,205,926.

(60) Provisional application No. 60/795,434, filed on Apr. 26, 2006, provisional application No. 60/801,961, filed on May 19, 2006, provisional application No. 60/810,598, filed on Jun. 1, 2006, provisional application No. 60/846,590, filed on Sep. 21, 2006.

(51) Int. Cl.
   *G01S 13/89* (2006.01)
(52) U.S. Cl. .............................. 342/22; 342/27; 342/179
(58) Field of Classification Search .................... 342/22, 342/179
   See application file for complete search history.

(56) References Cited

U.S. PATENT DOCUMENTS 4,866,424 A    9/1989   Parks
(Continued)

FOREIGN PATENT DOCUMENTS

JP    S61-206885    12/1986
(Continued)

OTHER PUBLICATIONS

Salamani et al. "An Integrated Platform for the Enhancement of Concealed Weapon Detection Sensors." Proc. SPIE vol. 3575. Nov. 1998. pp. 68-78.*

(Continued)

*Primary Examiner* — John B Sotomayor
*Assistant Examiner* — Matthew M Barker
(74) *Attorney, Agent, or Firm* — Kolisch Hartwell, P.C.

(57) ABSTRACT

A surveillance system is disclosed. In some embodiments, the surveillance system may include at least one controller adapted to control operation of first and second screening apparatus and to produce image data and screening data, to relate the image data to the screening data, and to produce relational information data from the related image data and screening data. In some embodiments, the system may include a first screening apparatus adapted to screen a subject in a subject position, a second screening apparatus adapted to screen the subject in the subject position, and a controller adapted to produce first and second screening data from the first and second screening apparatus, respectively, relate the first and second screening data, and to produce relational information data from the related first and second screening data.

14 Claims, 15 Drawing Sheets

U.S. PATENT DOCUMENTS

| | | | |
|---|---|---|---|
| 4,901,084 | A | 2/1990 | Huguenin et al. |
| 4,910,523 | A | 3/1990 | Huguenin et al. |
| 4,940,986 | A | 7/1990 | Huguenin |
| 4,964,309 | A | 10/1990 | Jenkins |
| 5,039,981 | A | 8/1991 | Rodriguez |
| 5,047,783 | A | 9/1991 | Hugenin |
| 5,073,782 | A | 12/1991 | Huguenin et al. |
| 5,078,952 | A | 1/1992 | Gozani et al. |
| 5,115,459 | A | 5/1992 | Bertozzi |
| 5,162,652 | A | 11/1992 | Cohen et al. |
| 5,170,169 | A | 12/1992 | Stephan |
| 5,181,234 | A | 1/1993 | Smith |
| 5,183,008 | A | 2/1993 | Carrano |
| 5,202,692 | A | 4/1993 | Huguenin et al. |
| 5,212,909 | A | 5/1993 | Morin |
| 5,227,800 | A | 7/1993 | Huguenin et al. |
| 5,323,004 | A | 6/1994 | Ettinger et al. |
| 5,367,552 | A | 11/1994 | Peschmann |
| 5,397,986 | A | 3/1995 | Conway et al. |
| 5,455,590 | A | 10/1995 | Collins et al. |
| 5,465,607 | A | 11/1995 | Corrigan et al. |
| 5,557,283 | A | 9/1996 | Sheen et al. |
| 5,592,083 | A | 1/1997 | Magnuson et al. |
| 5,600,303 | A | 2/1997 | Husseiny et al. |
| 5,680,103 | A | 10/1997 | Tuner et al. |
| 5,753,832 | A | 5/1998 | Bromberg et al. |
| 5,760,397 | A | 6/1998 | Huguenin et al. |
| 5,784,430 | A | 7/1998 | Sredniawski |
| 5,818,047 | A | 10/1998 | Chaney et al. |
| 5,845,692 | A | 12/1998 | Kellem et al. |
| 5,859,609 | A | 1/1999 | Sheen et al. |
| 5,930,326 | A | 7/1999 | Rothschild et al. |
| 5,974,111 | A | 10/1999 | Krug et al. |
| 6,040,191 | A | 3/2000 | Grow |
| 6,057,761 | A | 5/2000 | Yuki |
| 6,073,499 | A | 6/2000 | Settles |
| 6,078,047 | A | 6/2000 | Mittleman et al. |
| 6,088,423 | A | 7/2000 | Krug et al. |
| 6,094,472 | A | 7/2000 | Smith |
| 6,119,096 | A | 9/2000 | Mann et al. |
| 6,137,896 | A | 10/2000 | Chang et al. |
| 6,215,851 | B1 | 4/2001 | Meilunas et al. |
| 6,218,943 | B1 | 4/2001 | Ellenbogen |
| 6,334,365 | B1 | 1/2002 | Linker et al. |
| 6,342,696 | B1 | 1/2002 | Chadwick |
| 6,344,818 | B1 | 2/2002 | Markov |
| 6,375,697 | B2 | 4/2002 | Davies |
| 6,469,624 | B1 | 10/2002 | Whan et al. |
| 6,507,278 | B1 | 1/2003 | Brunetti et al. |
| 6,507,309 | B2 | 1/2003 | McMakin et al. |
| 6,518,915 | B2 | 2/2003 | Schutz et al. |
| 6,642,513 | B1 | 11/2003 | Jenkins et al. |
| 6,665,373 | B1 | 12/2003 | Kotowski et al. |
| 6,703,964 | B2 | 3/2004 | McMakin et al. |
| 6,708,572 | B2 | 3/2004 | Jenkins et al. |
| 6,721,391 | B2 | 4/2004 | McClelland et al. |
| 6,791,487 | B1 | 9/2004 | Singh et al. |
| 6,901,163 | B1 | 5/2005 | Pearce et al. |
| 6,927,691 | B2 | 8/2005 | Yuki |
| 6,937,182 | B2 | 8/2005 | Lovberg et al. |
| 6,952,163 | B2 | 10/2005 | Huey et al. |
| 6,965,340 | B1 | 11/2005 | Baharav et al. |
| 6,970,088 | B2 | 11/2005 | Kovach |
| 6,972,714 | B1 | 12/2005 | Baharav et al. |
| 6,985,122 | B2 | 1/2006 | Cohen |
| 7,030,761 | B2 | 4/2006 | Bridgelall et al. |
| 7,139,406 | B2 | 11/2006 | McClelland et al. |
| 7,183,963 | B2 | 2/2007 | Lee et al. |
| 7,225,979 | B2 | 6/2007 | Silverbrook |
| 7,280,068 | B2 | 10/2007 | Lee et al. |
| 7,283,085 | B2 | 10/2007 | Lee et al. |
| 7,298,318 | B2 | 11/2007 | Baharav et al. |
| 7,317,390 | B2 | 1/2008 | Huey et al. |
| 7,327,304 | B2 | 2/2008 | Baharav et al. |
| 7,333,055 | B2 | 2/2008 | Baharav et al. |
| 7,492,855 | B2 | 2/2009 | Hopkins et al. |
| 7,830,254 | B2 | 11/2010 | Huey et al. |
| 8,031,903 | B2 | 10/2011 | Paresi et al. |
| 2003/0056113 | A1 | 3/2003 | Korosec |
| 2003/0070076 | A1 | 4/2003 | Michael |
| 2003/0085163 | A1 | 5/2003 | Chan et al. |
| 2003/0128150 | A1 | 7/2003 | McMakin et al. |
| 2003/0171939 | A1 | 9/2003 | Yagesh et al. |
| 2003/0225612 | A1 | 12/2003 | DeSimone et al. |
| 2003/0231788 | A1 | 12/2003 | Yukhin et al. |
| 2004/0017930 | A1 | 1/2004 | Kim et al. |
| 2004/0041724 | A1 | 3/2004 | Levitan et al. |
| 2004/0090359 | A1 | 5/2004 | McMakin et al. |
| 2004/0140924 | A1 | 7/2004 | Keller et al. |
| 2004/0239549 | A1 | 12/2004 | Morgan et al. |
| 2004/0252807 | A1 | 12/2004 | Skatter et al. |
| 2004/0263379 | A1 | 12/2004 | Keller |
| 2005/0024199 | A1 | 2/2005 | Huey et al. |
| 2005/0031069 | A1 | 2/2005 | Kaucic et al. |
| 2005/0031076 | A1 | 2/2005 | McClelland et al. |
| 2005/0057354 | A1 | 3/2005 | Jenkins et al. |
| 2005/0073418 | A1 | 4/2005 | Kelliher et al. |
| 2005/0110672 | A1 | 5/2005 | Cardiasmenos et al. |
| 2005/0232459 | A1 | 10/2005 | Rowe et al. |
| 2006/0012510 | A1 | 1/2006 | Rowe |
| 2006/0022140 | A1 | 2/2006 | Connelly et al. |
| 2006/0066469 | A1 | 3/2006 | Foote et al. |
| 2006/0115109 | A1 | 6/2006 | Whitson et al. |
| 2006/0274916 | A1 | 12/2006 | Chan et al. |
| 2007/0195994 | A1 | 8/2007 | McClelland et al. |
| 2008/0174401 | A1 | 7/2008 | Reilly et al. |

FOREIGN PATENT DOCUMENTS

| | | |
|---|---|---|
| JP | S63-255683 | 10/1988 |
| JP | H9-197042 | 7/1997 |
| JP | H10-40371 | 2/1998 |
| JP | H10-148673 | 6/1998 |
| JP | H10-153655 | 6/1998 |
| JP | H10-282247 | 10/1998 |
| JP | H11-83996 | 3/1999 |
| JP | H11-133141 | 5/1999 |
| JP | 2001501304 | 1/2001 |
| JP | 2001235554 | 8/2001 |
| JP | 2001521157 | 11/2001 |
| JP | 2007502415 | 2/2007 |
| JP | 2007532907 | 11/2007 |
| JP | 2007536506 | 12/2007 |
| WO | 9811453 | 3/1998 |
| WO | 9921148 | 4/1999 |
| WO | 2005017559 | 2/2005 |
| WO | 2005101295 | 10/2005 |
| WO | 2005101307 | 10/2005 |

OTHER PUBLICATIONS

Patent Cooperation Treaty International Searching Authority, The International Search Report and the Written Opinion of the International Searching Authority for application No. PCT/US2007/67515, date of mailing Jul. 11, 2008. The PCT/US2007/67515 application is a PCT counterpart to U.S. Appl. No. 11/740,193.

May 10, 2011, Office Action from Japan Patent Office, in JP2007508412.

May 10, 2011, Office Action from Japan Patent Office, in JP2007508436.

The International Bureau of WIPO, Beate Giffo-Schmitt, Authorized Officer, International Preliminary Report on Patentablity for application No. PCT/US2007/067515, issue date Oct. 28, 2008. This U.S. application corresponds in part to the international '515 application.

U.S. Patent and Trademark Office, Office Action for U.S. Appl. No. 11/740,155, Mar. 2, 2011, 5 pages.

Steve Martyn, GRSI technical article , "A Total Mail and Parcel Security Management System," Glen Road Systems, Inc., Conshohocken, PA, 7 pgs. (2002-2003).

Quantum Magnetics, Inc., QScan QR 160 technical specification, "Entry-Point Screening for Explosives," Quantum Magnetics, Inc., San Diego, CA, 2 pgs. (at least as early as Oct. 7, 2003).

Quantum Magnetics, Inc., I-Portal 100 technical specification, "Advanced Weapons Detection Portal," Quantum Magnetics, Inc., San Diego, CA, 2 pgs. (at least as early as Oct. 7, 2003).

Metorex Security Products, Inc., Metor 150 technical specification, "Walk Through Metal Detector," Metorex Security Products, Inc., Ewing, NJ, 4 pgs. (at least as early as Oct. 7, 2003).

Metorex Security Products, Inc., Metor 200 technical specification, "Multi-Zone Walk Through Metal Detector," Metorex Security Products, Inc., Ewing, NJ, 4 pgs. (at least as early as Oct. 7, 2003).

Metorex Security Products, Inc., Metor 300 technical specification, "Multi-Zone Walk Through Metal Detector," Metorex Security Products, Inc., Ewing, NJ, 5 pgs. (at least as early as Oct. 7, 2003).

Rapiscan Security Products, Inc., Rapiscan 520B technical specification, Rapiscan Security Products, Inc., Hawthorne, CA, 2 pgs. (at least as early as Oct. 7, 2003).

Rapiscan Security Products, Inc., Secure 1000 technical specification, Rapiscan Security Products, Inc., Hawthorne, CA, 2 pgs. (Aug. 18, 2003).

GE Interlogix, EntryScan product description, GE Interlogix, website publication www.geindustrial.com, 1 pg. (Aug. 18, 2003).

GE Interlogix, Itemiser production description, GE Interlogix, website publication www.geindustrial.com, 2 pgs. (Aug. 18, 2003).

United States Patent and Trademark Office, Office Action for U.S. Appl. No. 11/679,106, mailing date Jun. 16, 2008. The present U.S. Appl. No. 11/740,193 claims priority to the '106 application.

U.S. Patent and Trademark Office, "Office Action for U.S. Appl. No. 11/740,133," mailing date Nov. 16, 2009 (15 pages). The '133 and '193 applications each claim priority to the same prior applications. The Dielectric People Portal II, Spatial Guardian, Inc., www.spatialguardian.com/products/people_portal/index.shtml.

Transportation Security What Works, Spatial Guardian, Inc., www.spatialguardian.com/news_transec_1102.shtml, Nov. 2002.

US Patent and Trademark Office, Office Action for U.S. Appl. No. 11/740,155, Sep. 13, 2010, 9 pages.

European Patent Office, Communication pursuant to Article 94(3) EPC for EP Application No. 05744646.0, Mar. 3, 2011, 5 pages.

European Patent Office, "Communication Pursuant to Article 94(3) EPC" for European application No. EP 05744646.0; Dec. 9, 2009; 5 pages.

D. D. Ferris, Jr. et al., "Sensors for Military Special Operations and Law Enforcement Applications," 1997, 8 pages, SPIE vol. 3062.

Nicholas G. Paulter, "Guide to the Technologies of Concealed Weapon and Contraband Imaging and Detection," Feb. 2001, 64 pages, National Institute of Justice, U.S. Department of Justice.

Mohamed-Adel Slamani et al., "Survey of Image Processing Techniques Applied to the Enhancement and Detection of Weapons in MMW Data," 2002, 10 pages, SPIE vol. 4719.

U.S. Patent and Trademark Office, "Office Action for U.S. Appl. No. 11/740,133," mailing date May 5, 2009 (13 pages).

USPTO Office Action regarding U.S. Appl. No. 12/958,239 dated Apr. 5, 2012, 19 pages.

USPTO Office Action regarding U.S. Appl. No. 11/740,155 dated Mar. 26, 2012, 13 pages.

European Patent Office; Extended European Search Report for EP 07868250.7; Aug. 17, 2012; 11 pages.

European Patent Office; Extended European Search Report for EP 09000485.4; Aug. 17, 2012; 7 pages.

Polillo, R.R.; "Secure Flow: a totally integrated transportation security system," IEEE Aerospace and Electronic Systems Magazine vol. 18 No. 3, pp. 12-15; Mar 1, 2003; 3 pages.

\* cited by examiner

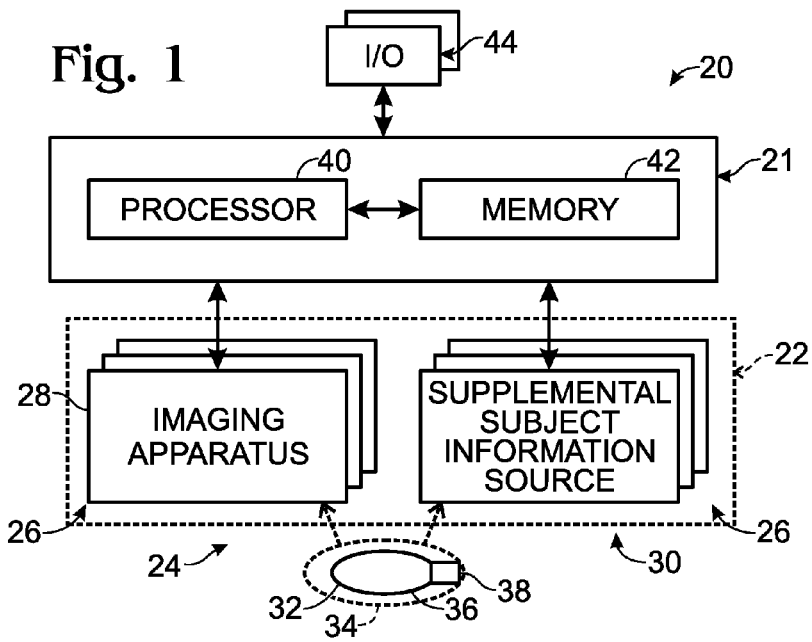
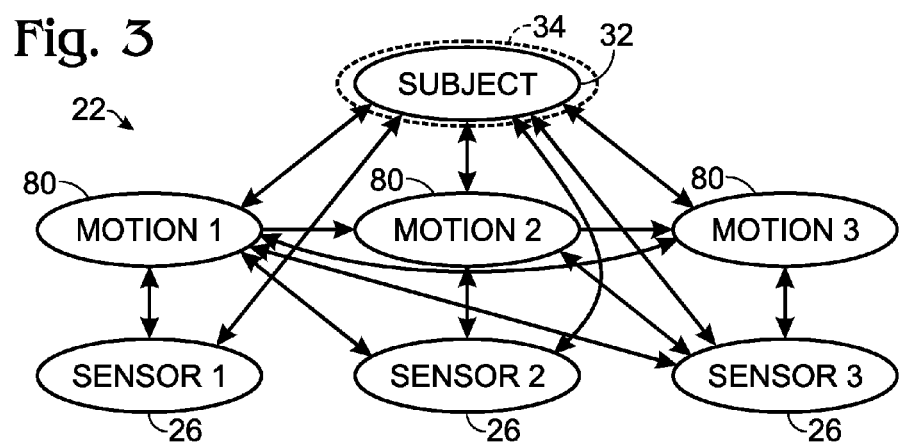
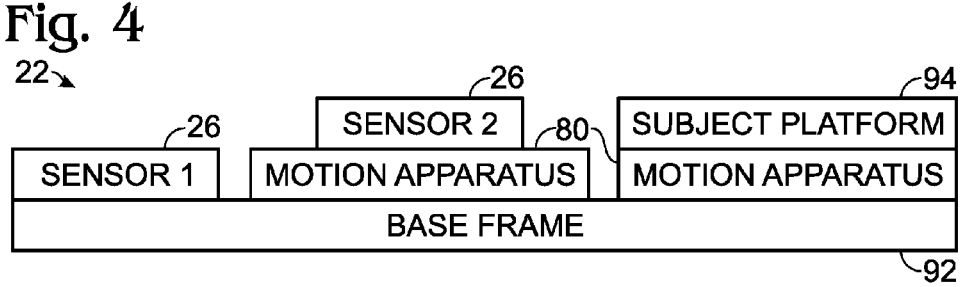

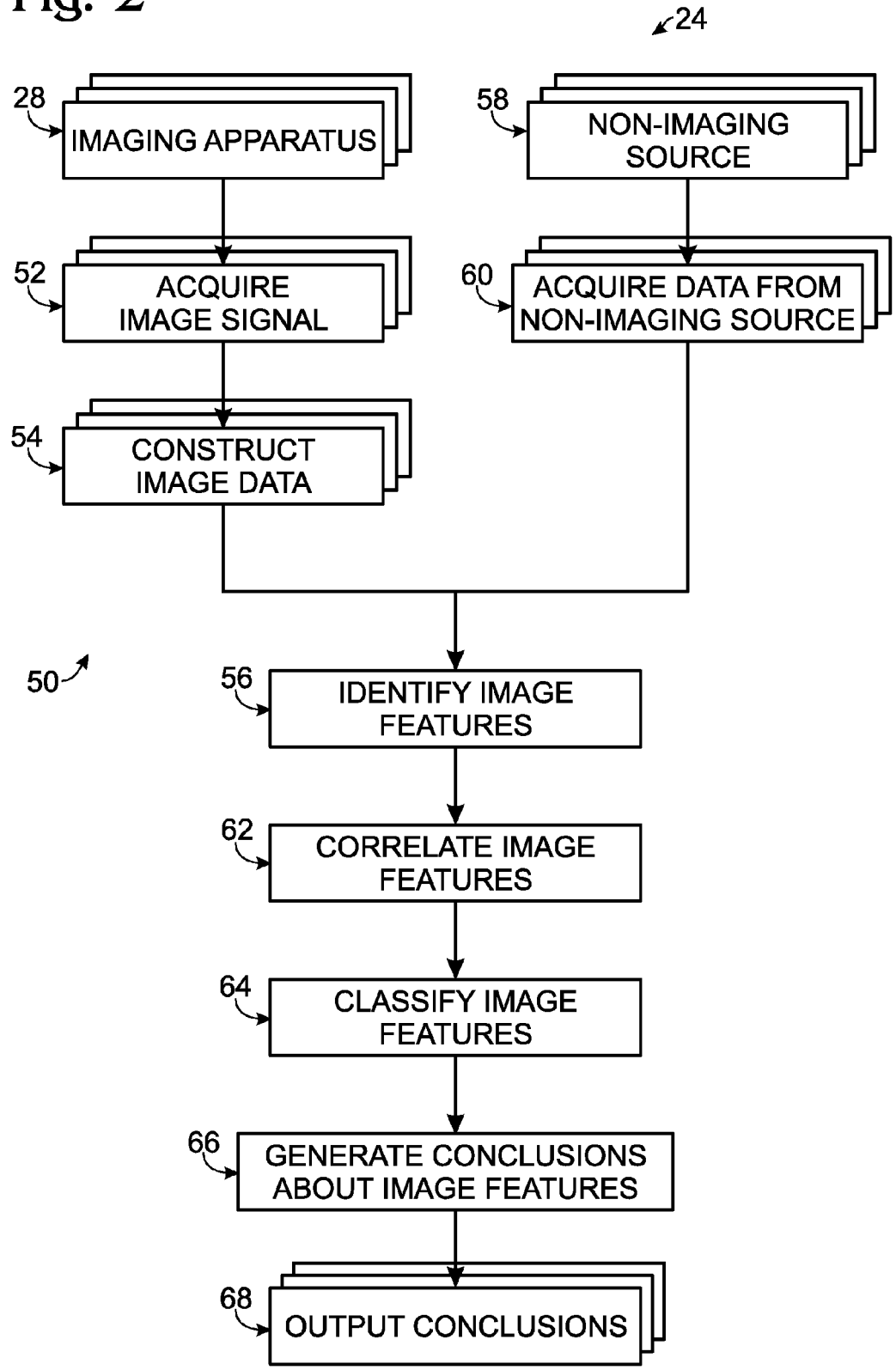

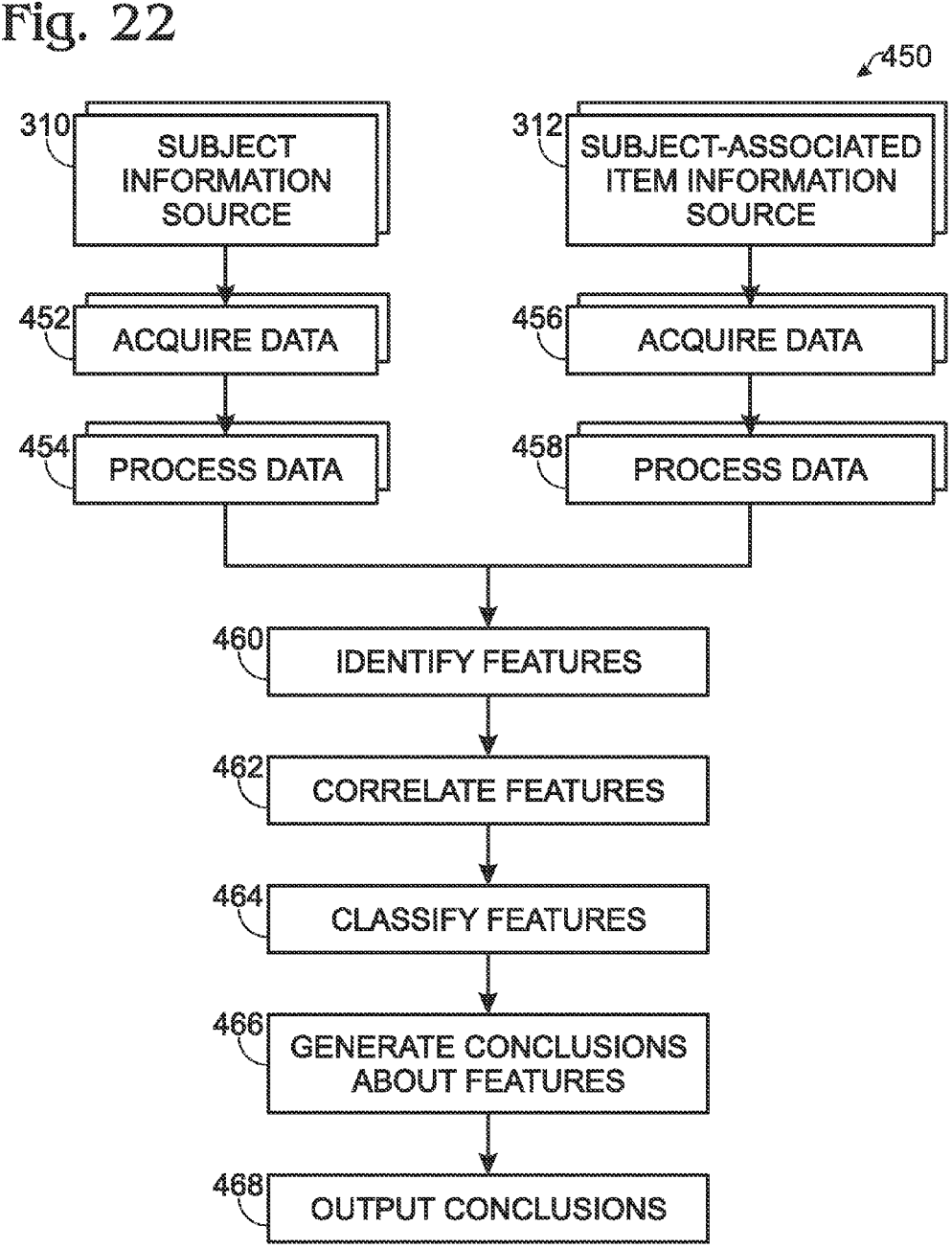

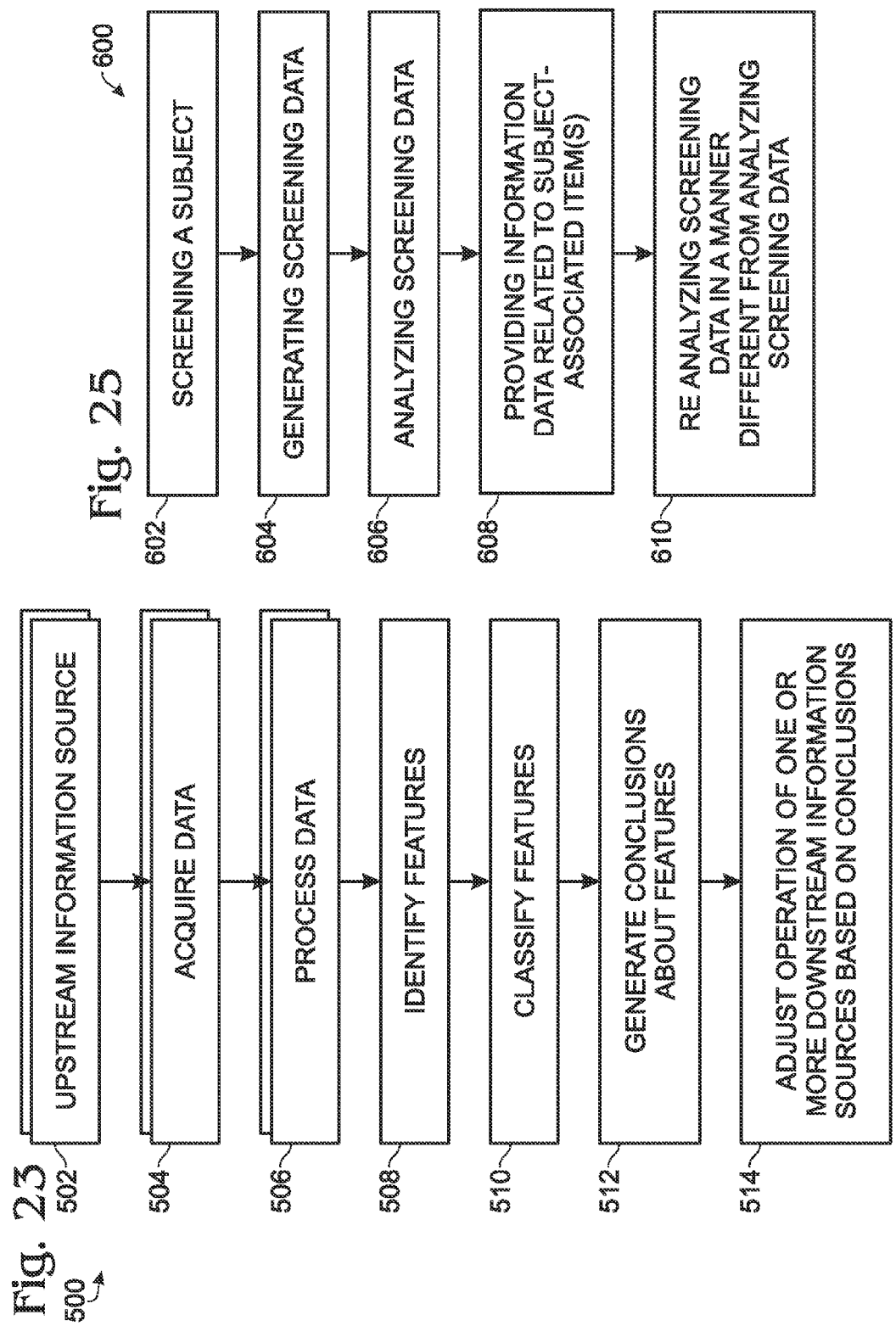

SURVEILLANCE WITH SUBJECT SCREENING

CROSS-REFERENCE TO RELATED APPLICATIONS

This application is a continuation-in-part of U.S. patent application Ser. No. 11/679,106, filed Feb. 26, 2007and entitled "Multi-Source Surveillance System," which is a continuation of U.S. patent application Ser. No. 10/825,530, filed Apr. 14, 2004 and entitled "Multi-Source Surveillance System," which issued as U.S. Pat. No. 7,205,926. Additionally, this application claims priority under 35 U.S.C. §119(e) to U.S. Provisional Patent Application Ser. No. 60/795,434, filed Apr. 26, 2006 and entitled "Security Checkpoint;" U.S. Provisional Patent Application Ser. No. 60/801,961, filed May 19, 2006and entitled "Security Checkpoint;" U.S. Provisional Patent Application Ser. No. 60/810,598, filed Jun. 1, 2006 and entitled "Security Checkpoint;" and U.S. Provisional Patent Application Ser. No. 60/846,590, filed Sep. 21, 2006 and entitled "Security Checkpoint." This application further is being filed concurrently with U.S. patent application Ser. No. 11/740,133 titled "Surveillance Systems and Methods with Subject -Related Screening," filed Apr. 25, 2007, and U.S. patent application Ser. No. 11/740,155 titled "Surveillance of Subject-Associated Items with Identifiers," filed Apr. 25, 2007. The complete disclosures of the above applications are herein incorporated by reference for all purposes.

BACKGROUND OF THE DISCLOSURE

Millimeter wave signals are used for radar and telecommunications. They are also capable of being used to produce an image of a subject by directing millimeter-wave signals at the subject and detecting the reflected signal. Examples of such imaging systems are described in U.S. Pat. Nos. 5,455,590; 5,557,283; 5,859,609; 6,507,309; 6,703,964; 6,876,322; and 7,034,746; U.S. Patent Application Publication Numbers 2004/0090359, 2004/0140924, 2006/0066469, and 2007/0075889; and U.S. patent application Ser. No. 11/088,470 filed Mar. 24, 2005. The complete disclosures of the above patent references are herein incorporated by reference for all purposes.

Imaging systems, including those systems described above, provide relatively detailed images of a subject, including a person's body and any objects carried by the person, whether or not the objects are concealed. An operator can view images of a subject and visually identify objects included with the person. Other detection devices can also be used to obtain other information about a subject. For instance, the subject can pass through a metal detector to determine if the subject has a detectable metal object.

Additionally, or alternatively, the surveillance system may include imaging systems and/or other detection devices to obtain information about subject-associated items, such as divested objects, checked baggage, and carryon baggage. For example, imaging systems may be used to produce images of checked baggage. An operator can view images of checked baggage and visually identify objects included with that baggage. Other detection devices can also be used to obtain other information about subject-associated items. For example, trace detection devices may be used to determine if the subject-associated item has an explosive substance or an illegal drug.

When the surveillance system is part of a process of boarding a public transportation vehicle, or entering a public or protected facility, substantial delays may be realized. Further, the effectiveness of the surveillance depends on the accuracy and attentiveness of the operator or operators.

SUMMARY OF THE DISCLOSURE

Some embodiments provide a surveillance system. In some embodiments, the surveillance system may include a first screening apparatus configured to produce first screening data representative of screening at least a portion of a subject, the subject including a person and one or more objects with the person; at least one controllable information source of subject-associated item information data related to one or more subject-associated items, wherein at least one of the subject-associated items includes checked baggage; and at least one controller configured to receive the first screening data and to control operation of the at least one controllable information source of subject-associated item information data based, at least in part, on the first screening data.

In some embodiments, the surveillance system may include a first information source of checked-baggage information data related to checked baggage associated with a subject; at least one controllable information source, other than the first information source, of at least one of (a) subject information data related to the subject and (b) subject-associated item information data related to one or more subject-associated items; and at least one controller configured to receive the checked-baggage information data and to control operation of the at least one controllable information source, other than the first information source, based, at least in part, on the checked-baggage information data.

In some embodiments, the surveillance system may include a first screening apparatus adapted to transmit toward and receive from a subject in a subject position, first electromagnetic radiation in a frequency range of about 100 MHz to about 2 THz, from positions spaced from the subject position, the subject including at least a portion of a person in a subject position and detectable objects carried by the person, the first screening apparatus producing from the received radiation, a first image signal representative of a first image of at least a portion of the subject; a second screening apparatus different than the first screening apparatus, and adapted to detect a given characteristic of an object potentially carried by at least one subject-associated item, and to produce a screening signal representative of the detection of the given characteristic; and a controller adapted to control operation of the first and second screening apparatus, and to produce, from the image signal, image data representative of the image of the at least a portion of the subject and screening data from the screening signal, to relate the image data to the screening data, and to produce from the related image data and screening data, relational information data about whether at least one of (a) the person and (b) the at least one subject-associated item is potentially carrying an object having the given characteristic.

Some embodiments provide a surveillance method. In some embodiments, the surveillance method may include screening at least a portion of a subject-associated item associated with a subject; generating screening data based, at least in part, on the screening of at least a portion of a subject-associated item; analyzing the screening data; obtaining, after analyzing the screening data, information data related to at least one of (a) the subject and (b) one or more subject-associated items other than the screened subject-associated item; and reanalyzing the screening data based, at least in part, on the information data, and in a manner that is at least partially different from the analyzing of the screening data.

In some embodiments, the surveillance method may include screening at least a portion of a subject, the subject including a person and one or more objects with the person; generating screening data based, at least in part, on the screening of at least a portion of a subject; analyzing the screening data; obtaining, after analyzing the screening data, information data related to one or more subject-associated items; and reanalyzing the screening data based, at least in part, on the information data, and in a manner that is at least partially different from the analyzing of the screening data.

In some embodiments, the surveillance method may include associating, with respective identifiers, a person and one or more carried items selected by the person to be carried by the person into a controlled-access area; screening the one or more carried items while physically separate from the person; and matching the identifier of the one or more screened carried items with the identifier of the person, and, if the identifiers match, giving possession of the screened carried items to the person prior to the person entering the controlled-access area.

Some embodiments provide a surveillance portal. The surveillance portal may include a first screening apparatus adapted to detect on a subject in a subject position a first characteristic of an object potentially carried by at least one of (a) the subject and (b) one or more subject-associated items, and to produce a first screening signal representative of the detection of the first characteristic; a second screening apparatus that is different from the first screening apparatus and is adapted to detect on the subject in the subject position a second characteristic of an object potentially carried by at least one of (a) the subject and (b) the one or more subject-associated items, and to produce a second screening signal indicating the detection of the second characteristic; and a controller adapted to control operation of the first and second screening apparatus, to produce first screening data indicating the detection of the first characteristic from the first screening signal, and second screening data indicating the detection of the second characteristic from the second screening signal, to relate the first screening data to the second screening data, and to produce from the related first and second screening data, relational information data about whether at least one of (a) the subject and (b) the one or more subject-associated items is potentially carrying an object having at least one of the first and second characteristics.

BRIEF DESCRIPTION OF THE FIGURES

FIG. 1 is a block diagram depicting an example of a general surveillance system having an imaging source and a supplemental subject information source.

FIG. 2 is a general flow chart illustrating an example of a method of operation of the surveillance system of FIG. 1.

FIG. 3 is an exemplary diagram illustrating various possible configurations for subject information assemblies usable in the surveillance system of FIG. 1, and having up to three sensors that move relative to a subject.

FIG. 4 is a block diagram illustrating an example of a subject information assembly of FIG. 3 having two sensor apparatus.

FIG. 22 is a general flow chart illustrating an example of a method of operation of the surveillance system of FIG. 20.

FIG. 23 is a general flow chart illustrating another example of a method of operation of the surveillance system of FIG. 20.

FIG. 25 is a general flow chart illustrating another example of a method of operation of the surveillance system of FIG. 20.

DETAILED DESCRIPTION OF THE DISCLOSURE

Figure 5:
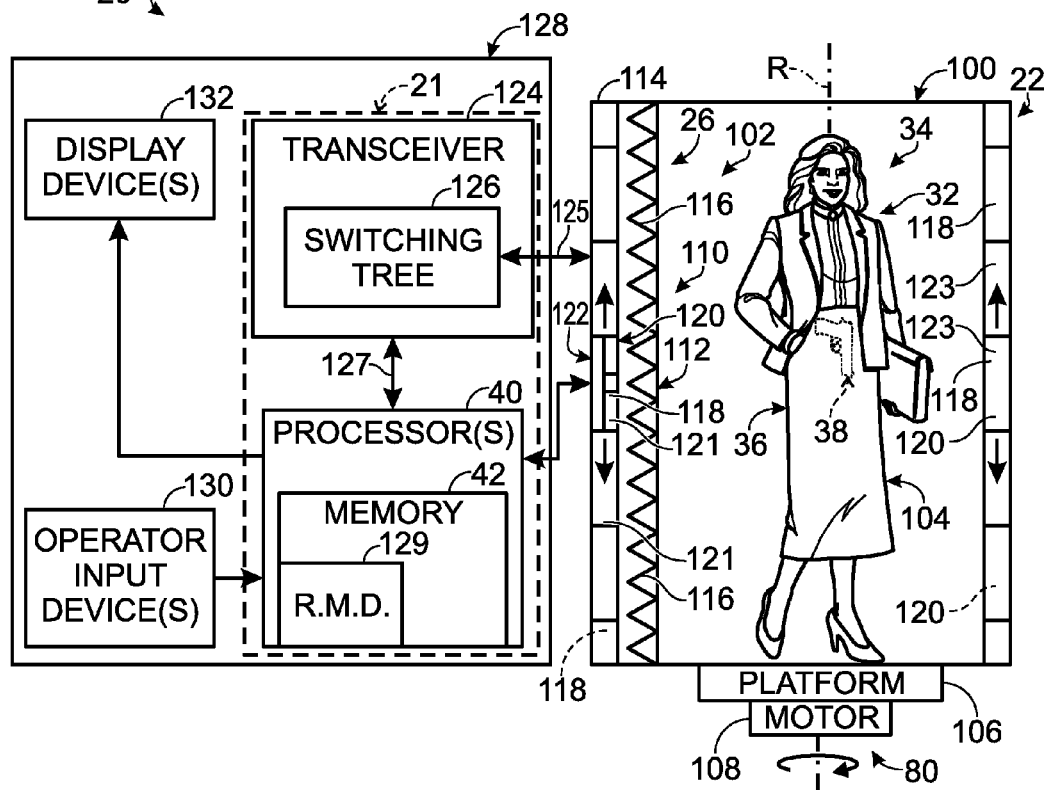
FIG. 5 is a general diagram showing an example of a surveillance system according to FIG. 1 and including a subject information assembly of FIG. 4.

FIG. 1 depicts a general surveillance system 20 including a controller 21 and a subject-information assembly 22 including a plurality of subject-related information sources 24. The subject information sources may include one or a plurality of screening or sensor apparatus 26, such as an imaging apparatus 28, and depending on the configuration, one or a plurality of supplemental subject information sources 30. The subject information sources provide information relative to a subject 32 in a subject position 34.

A subject 32 includes all that is presented in an interrogation station of a screening apparatus, whether human, animal, or inanimate object. For example, if a person 36 is in an interrogation station, the subject 32 includes the person as well as any objects 38 with an/or supported on the person, such as watches, keys, jewelry, pocket or other knives, coins, clothing accessories, guns, and/or any other objects.

An example of an imaging apparatus 28 is an active imaging apparatus adapted to transmit toward and receive from a subject in a subject position, millimeter-wave electromagnetic radiation. In some examples, the millimeter-wave radiation may be in the frequency range of 100 Megahertz (MHz) to 2 Terahertz (THz) range. Generally, the corresponding wavelengths range from several centimeters to a few micrometers. Such radiation may be either at a fixed frequency or over a range or set of frequencies using several modulation types, e.g. chirp, pseudorandom frequency hop, pulsed, frequency modulated continuous wave (FMCW), or continuous wave (CW).

Some embodiments of imaging apparatus may use a transmitting signal that incorporates frequencies in the range of 24 to 30 GHz, FMCW modulation, and having signal content that meets FCC unlicensed operation requirements and is outside of any restricted US Government frequency bands. Pulse lengths may range from 2-10 microseconds. Antennae beam widths may range from 20-120 degrees for broad beam implementation, or less than 30 degrees for narrow beam width applications, depending on the image formation signal processor requirements. Various system polarizations may be used. Examples include same polarization, cross polarization, elliptical polarization, right circular polarization, and/or left circular polarization.

Certain natural and synthetic fibers may be transparent or semi-transparent to radiation of such frequencies and wavelengths, permitting the detection and/or imaging of surfaces positioned beneath such materials. When the subject of interrogation is a clothed individual, image information about portions of a person's body covered by clothing can be obtained with system 20, as well as those portions that are not covered by clothing. Further, image information relative to objects carried by a person beneath clothing, regardless of how they are supported on the person, can be provided with system 20 for metal and non-metal object compositions, such as those used for weapons and contraband.

Controller 21 can be adapted to operate the sensor apparatus 26. In the example shown in which a sensor apparatus is an imaging apparatus 28, the controller is adapted to produce image data representative of an image of the subject from received radiation. Supplemental subject information sources 30 provide information about the subject 32 that is relatable to objects 38 potentially carried by the person 36. The source may be of a type that is different from imaging apparatus 28. The controller then is adapted to produce relational information relating the produced image signal and the subject information.

In some surveillance systems 20, a supplemental source 30 of subject information is a second sensor apparatus 26 adapted to detect a given characteristic of an object potentially carried by a person in the subject position. The controller 21 in such a system 20 is accordingly adapted to produce relational information about whether the person is carrying an object having the given characteristic. The second sensor apparatus may be adapted to detect one or more of a variety of subject information. The sensor apparatus may function sequentially or concurrently with other sensor apparatus. For example, the second sensor apparatus may detect one or more of a substance, such as a metal, explosive or other chemical substance; a feature identifying the person 36, such as a retinal image, facial image, fingerprint, volumetric or topographical representation of all or a portion of the body, other biometric feature, an identification or categorization badge or insignia, such as an insignia representing that the person belongs to a certain group, such as a security or police force, or radio frequency identification (RFID) device. Trace element detection can be based on ion mass spectrometry, quadrupole resonance, Fourier-transform infrared spectroscopy, vapor detection, chemical biological sensing, laser measurement, fluorescence, DNA analysis, and MEMS. Optionally, a supplemental source 30 may include context data stored in a memory. Context data relates to a person or potential objects carried by the person and/or subject-associated item(s) associated with the person, such as historical data relating to information previously detected or input about the particular person, any clearance the person might have to carry particular types of objects, such as guns or other security or law-enforcement devices, or other data that is considered to assist operators of surveillance system 20 in detecting and assessing the significance of objects carried by the surveilled person and/or subject-associated item(s) associated with the person.

Controller 21 can include a processor 40 in the form of any suitable component for processing the image data, such as digital circuitry, analog circuitry, or both. Processor 40 may be programmable, such as a computer or microprocessor, a dedicated hardwired state machine, a logic unit, or a combination of these. For a multiple processor form, distributed, pipelined, and/or parallel processing can be utilized as appropriate.

Processor 40 may include a memory 42. Memory 42 can be solid state, electromagnetic, optical, or a combination of these, and it can be volatile and/or nonvolatile. Further, it may be dedicated, such as a resident hard drive, a random access memory (RAM), or a removable, such as a removable memory device (R.M.D.). Presently typical removable memory devices include a floppy disc, tape cartridge, optical disc (CD-ROM or DVD), or other appropriate type. Memory 42 also may be a remote memory coupled to the processor by a wired or wireless communication link via another processor and/or network.

Controller 21 may be coupled to suitable input and/or output devices 44 adapted to receive data and transmit output data, such as a communication link to another system or other remote output device. Exemplary input devices may include a keyboard, mouse or other cursor-control device, a voice recognition input system, or other appropriate device or system. Output devices may include visual or audio alarms, printers, communications links, or displays, such as cathode ray tube (CRT), Liquid Crystal Display (LCD), plasma, organic light emitting diode (OLED), or other appropriate display type. Appropriate communication links may include local area networks (LANs), municipal area networks (MANs), or Wide Area Networks (WANs), whether private or public.

A general flow chart 50 illustrating exemplary operation of surveillance system 20 is shown in FIG. 2. Two data acquisition phases are illustrated. Where one or more of the subject information sources 24 are imaging apparatus 28, each imaging apparatus detects image information and produces a detected signal. Imaging apparatus can include apparatus that detects information relatable to zones or positions of the subject, such as subject surfaces or characteristics, as may be realized, such as using received radiation of appropriate form, such as acoustical waves, optical radiation, infrared radiation, millimeter-wave radiation or other radio-frequency radiation, Terahertz radiation, and x-ray radiation. The image signals are acquired for each imaging apparatus at 52. The acquired image signal is then processed at 54 to construct image data. Image features are then identified at 56. As is explained further below, image features derived from image data may be the shape, configuration, arrangement, or location of one or more objects 38 relative to a person 36.

Where one or more subject information sources 24 is a non-imaging source 58, the data from the non-imaging source is acquired at 60. A non-imaging source may be a sensor that detects general features of the subject, such as the general detection of a substance, a feature identifying the person 36, or context data stored in a memory relating to the subject. Image features are then identified at 56. The detection of the existence of a substance or an identification of the person or, a characteristic, class or categorization of the person, and other appropriate indicators or information are considered features of the subject.

Image features from the various subject information sources 24 are then correlated with each other at 62. For example, the identification of an object on the side of a person from an imaging apparatus may be correlated with the detection of metal in the middle zone of the person, a badge identifying the person, and context data previously stored in memory indicating that the person is a security guard and has high security clearance.

These correlated features may then be classified at 64 based on the combination of features. Classification of features is a logical process for determining the likelihood that a detected feature is a suspect object or a false alarm. For example, the detection of metal in the same zone as an object indicates that there is a high likelihood that the object is metal. Further, given that the person is identified as a security guard, it is highly likely that the object is a gun. Also, the person may be authorized to carry a gun in this position as part of her duties. The object would thus be given a high weight of being a suspect object, but given a low weight as a security risk, due to the status of the person as a security guard.

The processor may use a relational database to relate the various possible features relating to a subject that is surveilled. As a general example, the following truth table illustrates how two or three features, identified as features A, B, and C, may be related. Based on a determined relationship, an attribute, weight, or value, Vx, may be assigned to each combination. In this example, reference is made to a value, which term is intended to include attribute, weight, or other relative indicator. These values may be different or the same for different relationships, depending the application.

| Does Condition Exist? | | | | | | |
|---|---|---|---|---|---|---|
| A | B | C | A∧B | Value | A∧(B∧C) | Value |
| Yes | Yes | Yes | A (B) | $V_1$ | A (B∧C) | $V_5$ |
| Yes | Yes | No |  |  | A (B∧$\overline{C}$) | $V_6$ |
| Yes | No | Yes | A ($\overline{B}$) | $V_2$ | A ($\overline{B}$∧C) | $V_7$ |
| Yes | No | No |  |  | A ($\overline{B}$∧$\overline{C}$) | $V_8$ |
| No | Yes | Yes | $\overline{A}$ (B) | $V_3$ | $\overline{A}$ (B∧C) | $V_9$ |

-continued

| Does Condition Exist? | | | | | | |
|---|---|---|---|---|---|---|
| A | B | C | A∧B | Value | A∧(B∧C) | Value |
| No | Yes | No |  |  | $\overline{A}$ (B∧$\overline{C}$) | $V_{10}$ |
| No | No | Yes | $\overline{A}$ ($\overline{B}$) | $V_4$ | $\overline{A}$ ($\overline{B}$∧C) | $V_{11}$ |
| No | No | No |  |  | $\overline{A}$ ($\overline{B}$∧$\overline{C}$) | $V_{12}$ |

A(B) = A has the condition B
Example:
If A: image anomaly
$\overline{A}$: no anomaly detected
B: metal is detected
$\overline{B}$: no metal detected
C: explosive is detected
$\overline{C}$: no explosive detected Any set of corresponding features can be assigned a corresponding relative indicator, such as weight, value or attribute. For instance, an object identified in both a visible image and a millimeter-wave-based image can have a low value, since the object is visible. On the other hand an object not identified on a millimeter-wave-based image that is not visible, can be assigned a high value. Infrared sensors can also be used to confirm the existence of hidden objects, and can identify a hidden object that is not detected on a subject using millimeter-wave-based imaging. An area of a subject can thus be assigned a high value even though no image object is detected. For example, a sheet of plastic explosive taped to a person's body may appear "colder" than the rest of the person's body. Also, the combination of explosive and metal detectors, may be used to identify an imaged object as likely to be a plastic bomb with metal pieces. Such an object may then be given a very high value.

An object's (or subject area's) value may thus be based on the substances the object (or subject) includes, such as metal, plastic, dielectric, ceramic, tissue, fabric, paper, stone, plant matter. The structure of the object also can be the basis of assigning a value, such as dimensions, shape and edge characteristics. The chemical make-up of an object can also be the basis for assigning a value, including drugs, and explosives, such as PETN, TNT, plastic, C-4 and datasheet.

Once the image features are classified, then conclusions are generated at 66 about the combinations of image features.
A(B∧C): detected anomaly is metal and is explosive.
A(B∧$\overline{C}$): detected anomaly is metal and is not explosive.
A($\overline{B}$∧C): detected anomaly is not metal and is explosive.
A($\overline{B}$∧$\overline{C}$): detected anomaly is not met and is not explosive.
$\overline{A}$(B∧C): undetected anomaly is metal and is explosive.
$\overline{A}$(B∧$\overline{C}$): undetected anomaly is metal and is not explosive.
$\overline{A}$($\overline{B}$∧C): undetected anomaly is not metal and is explosive.
$\overline{A}$($\overline{B}$∧$\overline{C}$): undetected anomaly is not metal and is not explosive.

The various conclusions may then be output at 68, as appropriate, such as via a display, report or alarm condition. However, the steps discussed above may be performed in different sequences and in different combinations, not all steps being required for all embodiments of surveillance system 20.

There are various ways in which a subject information assembly can be configured. A surveillance system, in which sensor apparatus are mounted relative to a subject position and relative to the different sensor apparatus, can provide for different moving or non-moving configurations. For example, a given sensor apparatus may be adapted to move relative to the subject position but not move relative to one or more other sensor apparatus. FIG. 3 illustrates various possible configurations for a subject-information assembly 22 that includes three sensor apparatus 26 mounted relative to a subject 32 in a subject position 34. Optionally, the sensor apparatus may be mounted for motion relative to the subject position and to one another by motion apparatus 80. A motion apparatus is any appropriate device that provides mechanical motion of a sensor apparatus relative to the subject position or relative to another sensor apparatus or another motion apparatus. Examples of possible motion apparatus include a motor acting on a pinion guided along a rack, or a stepper motor moving a sensor apparatus along a track.

As used herein, moving a specified element M relative to another specified element N means the same thing as moving element N relative to element M. For example, element M could be fixed to a frame, and element M could be moved relative to element N by moving element N relative to the frame.

An arrow between two components shown in FIG. 3 represents a corresponding relationship. For instance, an arrow directly between the subject position 34 and a sensor apparatus 26 is intended to represent that the sensor apparatus does not move relative to the subject position. On the other hand, an arrow extending between the subject position and a motion apparatus, and between the motion apparatus and a sensor apparatus, indicates that the sensor apparatus moves relative to the subject position. This could be accomplished, for instance, by rotating the subject position on a floor and holding the sensor apparatus fixed relative to the floor, by holding the subject position fixed relative to the floor and moving the sensor apparatus along the floor, or by moving independently both the subject position and the sensor apparatus relative to the floor.

There are numerous possible configurations, a portion of which are shown in the figure. For example, where all three sensor apparatus are adapted to move relative to the subject position, this can be provided by one, two or three (or more) motion apparatus. Where two or three motion apparatus are used, the second and subsequent motion apparatus may be mounted relative to one or more other motion apparatus, thereby potentially providing for the capability of moving concurrently in multiple directions, depending on how the respective movement apparatus are operated.

FIG. 4 illustrates an optional configuration in block diagram form of a subject information assembly 22 that may be used in a surveillance system 20. Subject information assembly 22 may include a base frame 92, which may be a floor or other work surface, relative to which a first sensor apparatus 26 is directly mounted. A first motor or other motion apparatus 80 is mounted for providing relative motion between the base frame and a second sensor apparatus 26. A subject platform 94, which defines the subject position 34, may then be mounted relative to a second motion apparatus 80 mounted in turn relative to base frame 92.

An example of a surveillance system 20 having a subject-information assembly, 22 configured as shown in FIG. 4, is depicted in FIG. 5. System 20 of FIG. 5 includes a controller 21 adapted to control a subject information assembly 22 mounted in a surveillance station or portal 100 defining a subject position 34. In this example, subject information assembly 22 includes a first sensor apparatus 26 in the form of an active, millimeter-wave imaging apparatus 102, adapted to interrogate subject 32 by illuminating it with electromagnetic radiation in the 100 Megahertz (MHz) to 2 Terahertz (THz) frequency range and detecting the reflected radiation, as has been described.

As illustrated in FIG. 5, subject 32 includes a person 36 presented for interrogation by system 20. Person 36 is shown wearing clothing 104, which conceals object 38, shown in the form of a weapon. Subject 32 is positioned in interrogation station or portal 100 of system 30. Portal 100 may be configured for placement at a security checkpoint where it is desired to detect objects, such as weapons or contraband, on the person. Portal 100 may include a platform 106 connected to a motion apparatus 80 in the form of a motor 108. Platform 106 may be arranged to support subject 32. Motor 108 may be arranged to selectively rotate about rotational axis R while subject 32 is positioned thereon. For the configuration shown, axis R may be vertical, and subject 32 may be in a generally central subject position 34 relative to axis R and platform 106.

Imaging apparatus 102 may include an antenna apparatus 110 including a primary multiple-element sensing array 112. Subject information assembly 22 may include a frame 114 on which array 112 may be supported. Array 112 may extend the full height of frame 114. Motor 108 causes platform 106, and subject 32 to rotate about axis R. As a result, array 112 circumscribes a generally circular pathway about axis R. The antenna array may be about 0.5 to about 2 meters from radius R.

Antenna array 112 may include a number of linearly arranged elements 116 only a few of which are schematically illustrated. Each element 116 may be dedicated to transmission or reception of radiation, and the elements may be arranged in two generally vertical columns, with one column dedicated to transmission, and the other to reception. The number and spacing of the elements corresponds to the wavelengths used and the resolution desired. A range of 200 to about 600 elements can span a vertical length of about two or two and one-half meters.

Subject information assembly 22 includes a second sensor apparatus 118. Optionally, additional sensor apparatus may be mounted to second sensor apparatus 118, such as a third sensor apparatus 120. The second sensor apparatus may be mounted by a prime mover 122, for vertical movement along frame 114. Thus, as platform 106 rotates about axis R, sensor apparatus 118 scans the zone or location of the subject corresponding with the vertical position of the sensor and the rotational position of the subject.

Various other configurations for portal 100 and antenna apparatus 110 may be used. For example, a two-dimensional transmit and receive array may be used, as well as an array that moves around a fixed subject platform, or an array that moves vertically and extends horizontally. Further, many variations of an antenna apparatus are possible. The antenna apparatus may include one or more antenna units, and each antenna unit may include one or more transmitting antennae and one or more receiving antennae. An antenna unit may include a plurality of antennae that may receive radiation in response to transmission by a single antenna. The antennae may be any appropriate type configured to transmit or receive electromagnetic radiation, such as a slot line, patch, endfire, waveguide, dipole, semiconductor, or laser. Antennae may both transmit and receive. The antennae units may have one or more individual antennae that transmit or receive like polarization or unlike polarized waveforms such as plane, elliptical, or circular polarization, and may have narrow or broad angular radiation beam patterns, depending on the application. Beam width may be relatively broad, i.e. 30 to 120 degrees for imaging applications that use holographic techniques, while narrow beam widths in the range of 0 to 30 degrees may be used for applications having a narrow field of view requirement.

Further, a single antenna may scan a subject by mechanically moving about the subject in a one- or two-dimensional path. A one- or two-dimensional array of antenna units may electronically and mechanically scan a subject. An imaging system may include one or a plurality of antenna apparatus.

The antennae apparatus may be protected from the environment by suitable radome material, which may be part of the apparatus, or separate, depending on the mechanical motion that is required of the antennae apparatus or array. Examples of other array configurations are illustrated in copending patent application Ser. No. 10/728,456 filed Dec. 5, 2003, entitled "Millimeter-Wave Active Imaging System" incorporated herein by reference.

Antenna apparatus 48 may be configured to transmit and receive electromagnetic radiation selected from the range of about 1 Gigahertz (GHz) to about 2 THz, or from the range of about 100 MHz to about 15 GHz, depending on the impulse duration. A range of about 1 GHz to about 300 GHz may also be used, with a range of about 5 GHz to about 110 GHz particularly useful for imaging. A range of 24 GHz to 30 GHz is used in some antenna apparatus. The antenna apparatus produces an image signal 68 representative of the received radiation.

Various configurations of second and third sensor apparatus are also possible. For example, a plurality of sensor apparatus 118 may be mounted along antenna array 112 in fixed positions. Each sensor apparatus 118 or 120 may have a sensor unit 121 (such as a receiver) on one side of subject position 34 and a complementary unit (such as a transmitter) on an opposite side or other spaced position, as represented by sensor unit 123.

A controller 21 may control operation of subject information assembly 22. Controller 21 may include a transceiver 124 including a switching tree 126 configured to irradiate subject 32 with only one transmitting element 116 at a time, and simultaneously receive with one or more elements 116. Transceiver 124 may include logic to direct successive activation of each combination of transmit and receive antenna elements to provide a scan of a portion of a subject 32 along a vertical direction as platform 106 and the subject rotate.

An image signal 125 received from antenna apparatus 110 may be downshifted in frequency and converted into an appropriate format for processing. In one form, transceiver 124 may be of a bi-static heterodyne Frequency Modulated Continuous Wave (FM/CW) type like that described in U.S. Pat. No. 5,859,609. Other examples are described in U.S. Pat. Nos. 5,557,283 and 5,455,590. In other embodiments, a mixture of different transceiver and sensing element configurations with overlapping or non-overlapping frequency ranges may be utilized, and may include one or more of the impulse type, monostable homodyne type, bi-static heterodyne type, and/or other appropriate type.

Transceiver 124 may provide image data 127 corresponding to the image signals to one or more processors 40. Processor 40 can include any suitable component for processing the image data, as appropriate. Processor 40 is coupled to a memory 42 of an appropriate type and number. As has been mentioned, memory 42 may include a removable memory device 129, as well as other types of memory devices.

Controller 21 may be coupled to motor 108, prime mover 122, or other drive element used, to selectively control the rotation of platform 106 or movement of a sensor apparatus 26. Controller 21 may be housed in a monitor and control station 128 that also includes one or more input/output devices 44, such as operator input devices 130 and one or more display or other type of output devices 132.

Figure 6:
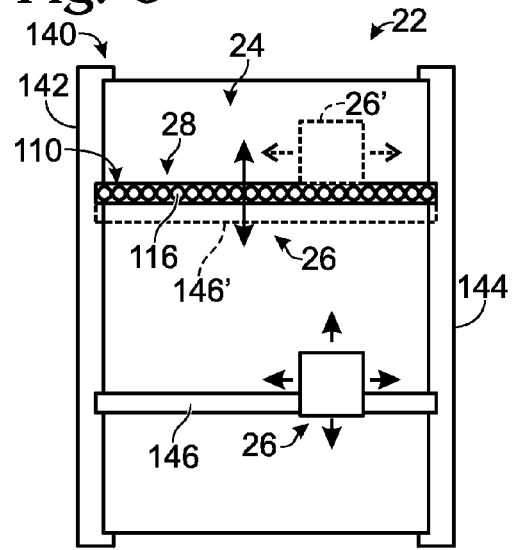
FIG. 6 is a side view of another example of a subject information assembly of FIG. 3.

FIG. 6 illustrates a simplistic side view of another embodiment of a subject information assembly 22, usable in surveillance system 20 as has been described. In this example, subject information assembly 22 has a base frame 140 including left upright 142 and right upright 144. A first information source 24 is a sensor apparatus 26 in the form of an imaging apparatus 28, and in particular, an antenna apparatus 110, such as was described with reference to FIG. 5.

Antenna apparatus 110 includes array elements 116 that may be mounted by a primary motion apparatus, not shown, to frame 140 for moving vertically. A second sensor apparatus 26 may be mounted relative to an intermediate frame 146 by a second motion apparatus, also not shown. In turn, intermediate frame 146 may be mounted relative to base frame 140 by a further motion assembly, also not shown. The subject information assembly 22 shown in FIG. 6 thus may provide for independent movement of the first and second sensor apparatus 26. Optionally, a second sensor apparatus 26' may be mounted on an intermediate frame 146' for movement with the first sensor apparatus 26 and relative to (along) the antenna apparatus 110.

Figure 7:
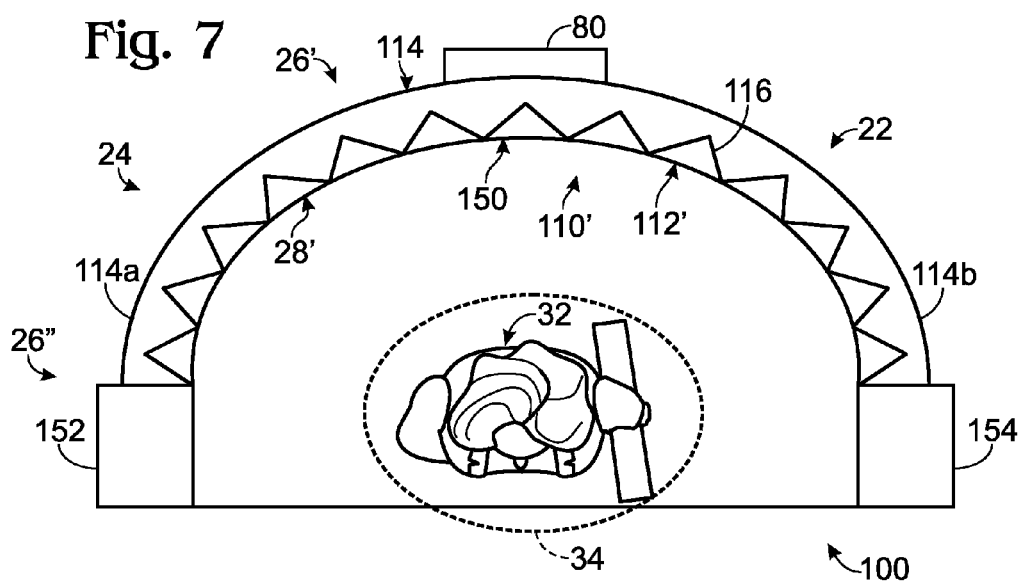
FIG. 7 is a top view of yet another example of a subject information assembly of FIG. 3.

A simplified top view of a further variation of a subject information assembly 22 for a portal 100 and usable in a surveillance system 20, is shown in FIG. 7. In this example, subject information sources 24 include first and second sensor apparatus 26. A first sensor apparatus 26' includes an active millimeter-wave imaging apparatus 28', as described above, having an antenna apparatus 110' formed as a horizontal array 112'. Array 112' may have various configurations, and is shown with array elements 116 extending in a convenient arc 150 around a subject 32 in a subject position 34.

Array 112' is shown mounted on a frame 114 having opposite distal ends 114a and 114b. Second sensor apparatus 26" also includes a first sensor unit 152 and a second sensor unit 154 mounted, respectively, on frame ends 114a and 114b. Sensor units 152 and 254 may be the same type of sensor, or different types of sensors, when a single sensor unit is sufficient. If sensor apparatus 26" is of a type that requires a send or transmit unit and a spaced-apart complementary receive unit, then the two sensor units can be the two components required. Examples of such sensor apparatus include metal detectors, some imaging systems, and trace chemical detectors. With trace chemical detectors, one sensor unit may direct air toward the subject, such as by a fan, and a second sensor unit draws in the air, which air is then checked for the trace element or elements of interest.

By traveling vertically with the imaging array 112, the second sensor apparatus 26" senses subject information at a level corresponding with the position of the imaging array. As a result, characteristics of the image in the position or zone of the image corresponding to which supplemental subject information are detected, can be correlated with the subject information to provide further information relating to the detected image of the subject. Other configurations for the second sensor apparatus can also be realized. For example, the sensor units may be mounted in fixed positions on a fixed portion of frame 114. Also, a plurality of sensor units can be distributed vertically along fixed portions of frame 114, and mounted in fixed positions independent of array 112', to provide zonal subject information. Optionally, the sensor units may be mounted independent of imaging apparatus 28', and may move or not, as was discussed with reference to subject information assembly 22 shown in FIG. 3. For instance, a sensor unit may be a device for receiving a card, token or other item handled by the surveilled person, which item is then tested for a trace element. Another technique for obtaining a trace element would be to mount the sensor units in handles that the person grasps during imaging. The surface of the handles could be wiped or removed and tested for trace elements, or air could be drawn in through or around the handle for testing.

A motion apparatus 80 is adapted to move the first and second sensor apparatus 26 vertically. Accordingly, a subject 32 may be imaged on one side by moving the array vertically from top to bottom or from bottom to top. In order to image both sides of a subject, then, it is necessary to scan the opposite side of the subject. This can be accomplished in various ways, such as having the subject turn around. Optionally, a second array, opposite the array shown, could be provided. Also, the array shown could be rotated around the subject position.

Following is a description that illustrates a method for providing a blurred image of a subject for protection of privacy concerns of surveilled subjects, as well as for automatic identification of portions of an image suspected of including objects carried by the surveilled person. This description is presented largely in terms of display images, algorithms, and symbolic representations of operation of data bits within a computer memory. It may be preferred to implement a program or algorithm as various interconnected distinct software modules or features. This is not necessary, as software, firmware, and hardware may be configured many different ways, and may be aggregated into a single processor and program with unclear boundaries.

An algorithm is generally considered to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. When stored, they can be stored, transferred, combined, compared, and otherwise manipulated. When stored, they may be stored in any computer-readable medium. As a convention, these signals may be referred to as data, bits, values, elements, symbols, characters, images, terms, numbers, or the like. These and similar terms may be associated with appropriate physical quantities and are convenient labels applied to these quantities.

The present disclosure also relates to apparatus for performing these operations, such as has been described. This apparatus may be specially constructed for the required purposes or it may comprise a general-purpose computer selectively activated or reconfigured by a computer program stored in the computer or other apparatus. In particular, various general-purpose machines may be used with programs in accordance with the teachings herein, or it may prove more convenient to construct more specialized apparatus to perform the required method steps. The required structure for a variety of these machines will appear from the description given below. Useful machines for performing the disclosed operations include general-purpose digital computers, microprocessors, or other similar devices, as has been described.

The programs described need not reside in a single memory, or even a single machine. Various portions, modules or features of it can reside in separate memories, or even separate machines. The separate machines may be connected directly, or through a network, such as a local access network (LAN), or a global or wide area network, such as what is known as the Internet. Similarly, the users need not be collocated with each other, but each only with a machine that houses a portion of the program.

Figure 8:
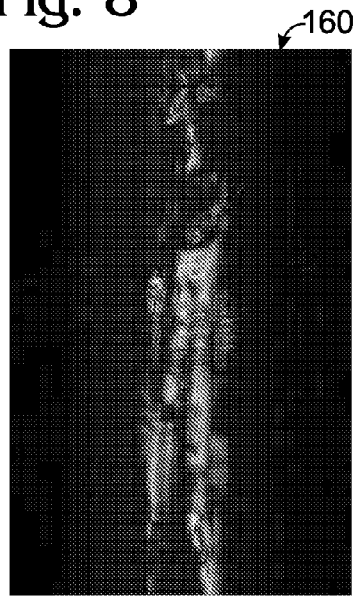
FIG. 8 is an image generated by a millimeter-wave imaging system of a mannequin having objects hidden by clothes on the mannequin.
Figure 9:
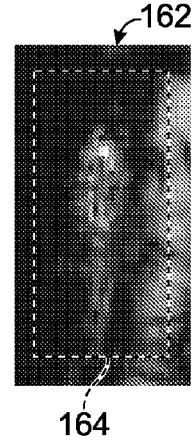
FIG. 9 is an enlarged view of a portion of the image of FIG. 8 showing an object.

Various techniques may be used for identifying objects that may be associated with a person being imaged. For example, once a first image of a subject has been obtained, objects are detected visually by an operator of the system or automatically. When manual detection is used, a primary or first image 160, such as the image of FIG. 8, may be displayed on a system monitor. An operator may then identify positions or areas of the image that are suspected of being objects. For example, FIG. 9 illustrates an enlarged second image 162 of a portion of the image of FIG. 8 as defined by an outline 164 around the suspect area. Such an area may be defined and the enlarged image produced using image-enhancing algorithms. Such a program may also provide for image enhancement and increased resolution, in order to produce a clearer image of the region in a selected suspect area. For instance, the program may increase the number of picture elements or pixels used to image the suspect area. Image enhancement tools, such as interpolation techniques, may be used to make the image sharper.

Once a suspect area containing a possible object other than the person, is identified, the antenna apparatus may be used to provide a more detailed image of the suspect area. For instance, a secondary antenna array, not shown, may be used to re-image the suspect area in greater detail than was originally provided.

Optionally, imaging arrays may be used to re-image the suspect area. Increased resolution may be possible by increasing the firings per surface area of the subject, such as by reducing the rate of movement of the subject relative to the antenna array, or increasing the scanning rate for the antenna array. It may also be possible to produce the first, low-resolution image using a portion of antenna elements in the array, and to produce a second, higher-resolution image using all of the antenna elements corresponding to the selected region of the subject.

Accordingly, the image signal, whether it be a reworking of the portion of the image signal corresponding to the first image or a portion of the image signal corresponding to a rescan of the selected subject area, a secondary image may be produced that has a higher resolution than the primary image. This image may then be displayed for observation by an operator, to better determine whether an object is present, and if so, the nature of the object.

Characteristics of image data may also be automatically analyzed to determine whether there may be areas of an image that may include an object. Regions of a subject image that have characteristics that correspond to characteristics of images of known objects may be identified. By automatically identifying suspect areas of an image, a system operator's attention may be directed to such areas, the information may be used to activate alarms, and the information may be used to initiate a rescanning of the suspect areas or to otherwise increase the resolution of the image.

It has been found that objects carried by a person may have the appearance of a "wavy texture" in the vicinity of objects hidden on a person. FIG. 8 shows an example of an image 160 of a mannequin with man-made objects placed on its body. This image is comparable to an image of a person. This image is comparable to an image of a person. In the figure, the image of a knife appears on the abdomen, and an image of a gun appears on the back. Second image 162 shown in FIG. 9 is an enlargement of the image of the knife shown in FIG. 8. An image characterized as having picture elements with alternating high and low intensity levels, appearing as light and dark regions, may be suspected of being an object. This varying intensity level pattern or wavy texture pattern is visible in the image on and/or around the object.

The waviness may be detected by convolving the image with a waviness detection kernel. An exemplary kernel is given by the following five-by-five matrix of values:

$$0.0278 \quad -0.1111 \quad 0.1667 \quad -0.1111 \quad 0.0278$$
$$-0.1111 \quad 0.4444 \quad -0.6667 \quad 0.4444 \quad -0.1111$$

-continued 0.1667  −0.6667  1.0000  −0.6667  0.1667

−0.1111  0.4444  −0.6667  0.4444  −0.1111

0.0278  −0.1111  0.1667  −0.1111  0.0278

Figure 10:
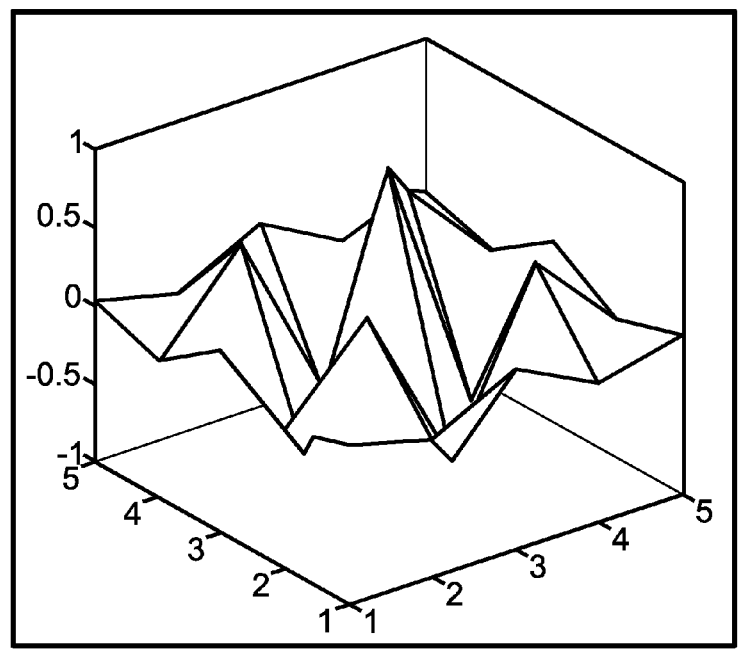
FIG. 10 is a graphic illustration of the values of a kernel used for object detection.

The "wavy" nature of the above set of numbers is illustrated graphically in FIG. 10, which illustrates the relative magnitudes of a five-row-by-five-column grid corresponding to pixel positions. The values in the rows and columns of the kernel shift between higher and lower values, or in this case, between negative and positive values, hence the term "wavy".

The kernel numbers above can be thought of as a small image window covering a corresponding five-by-five square of picture elements, which window is moved above (associated with successive corresponding portions of) the image. Each value in the kernel is multiplied by the corresponding image intensity value (right below it) and the final result of the operation is the sum of the results of the 25 multiplications. Generally, the closer the relative values of the intensities of the pixels overlaid by the window are to the relative values in the kernel, the higher the magnitude or absolute value of the resulting sum.

Figure 11A:
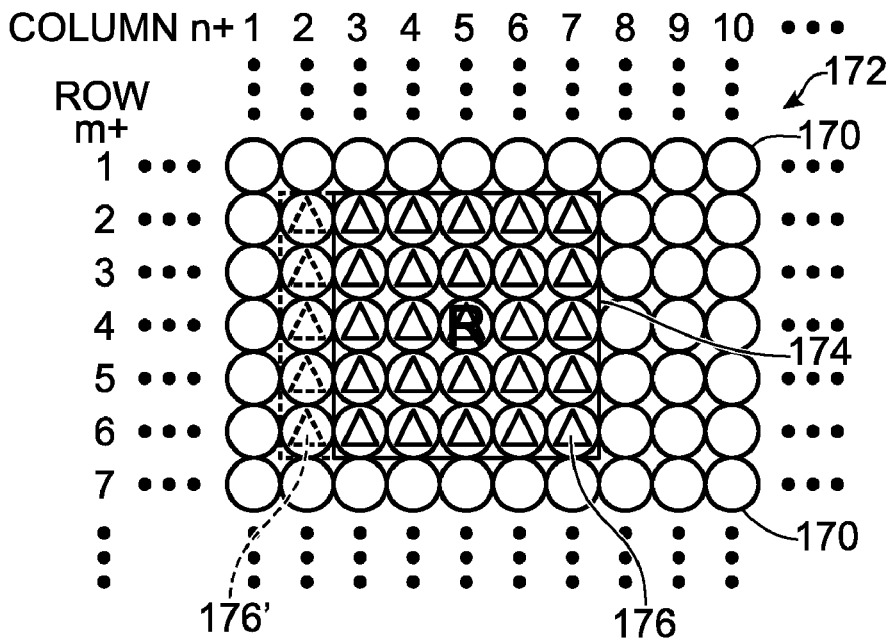
FIGS. 11A and 11B illustrate a sequence of steps illustrating application of a kernel to an image.
Figure 11B:
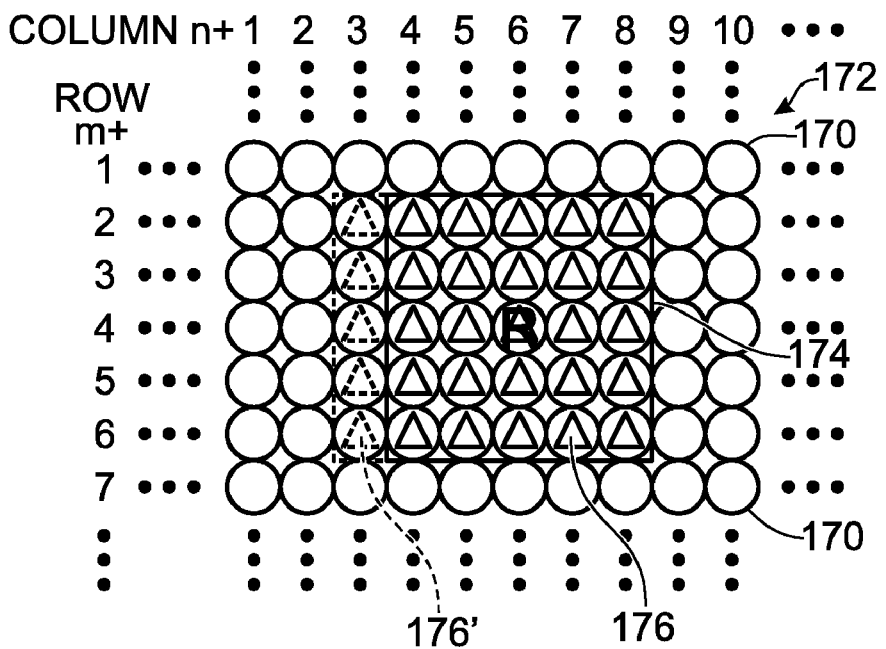

An illustration of this operation is depicted in FIGS. 11A and 11B, which show two consecutive positions of the kernel window. In these figures, the circles 170 represent the intensity levels of pixels making up a subject image 172. The square 174 represents the "window" of the kernel, with the kernel values represented by the triangles 176. The triangles 176' shown in dashed lines to the left of square 174 simply represent a row of pixels that were included in window 174 during the previous computation. As mentioned, each kernel value is multiplied by the intensity level of the pixel it is associated with in a given position of the window. The resulting 25 products are summed. The absolute value of the sum is assigned to a reference pixel R, which may be any pixel position considered appropriate. In this example, the pixel in the center of the window is considered the reference pixel.

This sum provides an indication of the correlation of the 25 pixels associated with the reference pixel to the relative variations or texture represented by the kernel. The higher the absolute value of the sum, then the higher the correlation.

Figure 12:
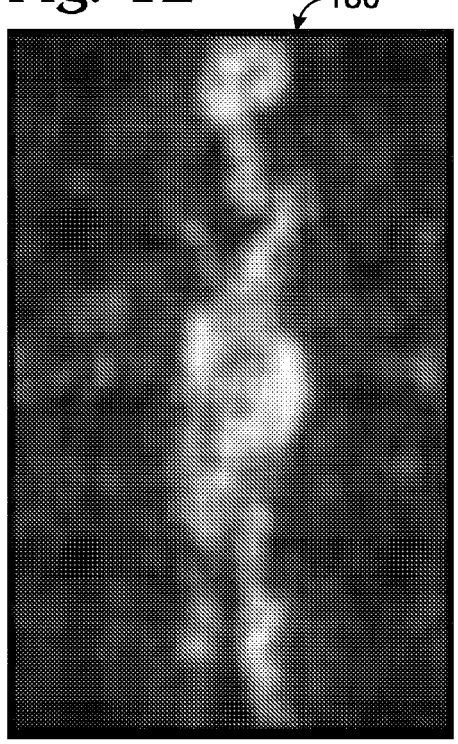
FIG. 12 is an image resulting from applying the kernel of FIG. 10 to the image of FIG. 8 to identify suspect areas of the image.

FIG. 11B shows the position of window 174 during the next step in which the window is shifted one pixel row to the right. This process continues until the subject image 172 is convolved into a new "image" with its values containing the results of the above operation for each pixel or selected pixels of the image. After smoothing and stretching to occupy a fixed dynamic range, the new image is a "waviness image" 180 shown in FIG. 12, in which the lighter areas indicate the local presence of the waviness texture. In other words, the image of FIG. 12 is a mapping of the extent the selected subject-image characteristic is present. It is seen in the waviness image that the biggest and brightest regions of waviness appear where the knife and gun are in the original subject image.

Figure 13:
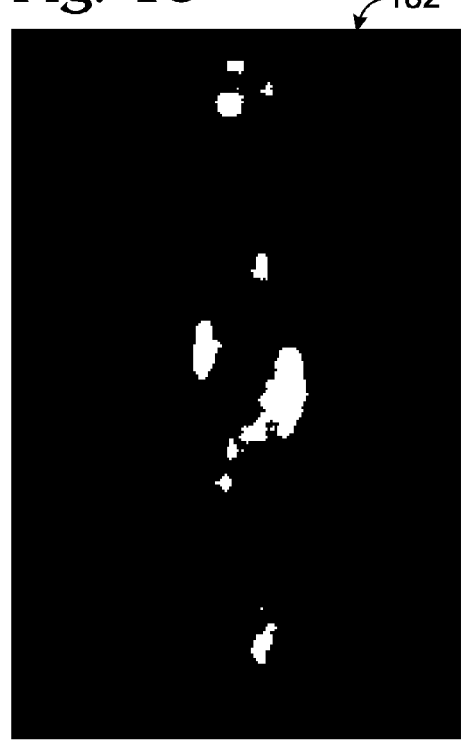
FIG. 13 is an image resulting from applying a threshold to the image of FIG. 12.

Once the waviness image is produced from the original subject image, the brightest regions of the waviness image may be identified by running a threshold analysis on the image. Small contrasting regions or holes may also be eliminated in order to make the resulting image more uniform. In this analysis, a new image 182 as shown in FIG. 13 is produced by assigning a distinct intensity level, such as that corresponding to white, to those regions of the waviness image having at least a selected intensity or waviness value, such as 80 percent of maximum. The other regions are assigned a distinguishable value, such as zero or black level intensity. This image then shows those regions in which strong correlation exists for the selected image characteristic.

Figure 14:
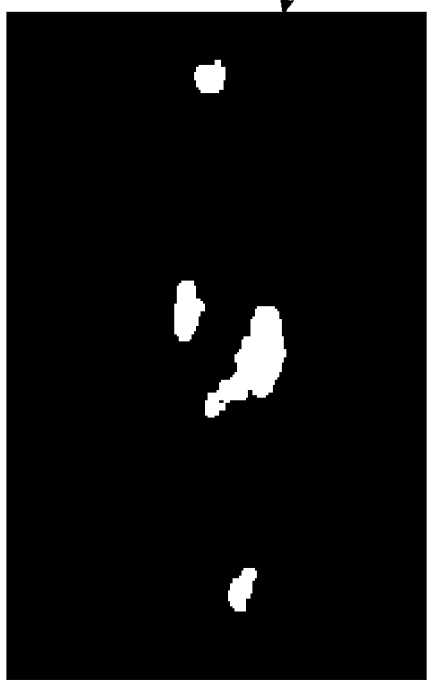
FIG. 14 is an image resulting from dilating the highlighted areas of the image of FIG. 13 and removing small regions.

The intent is to identify graphically those regions of the subject image where there are suspected objects. These regions can then be displayed or otherwise identified to a system operator, so that they can evaluate the images or the subject further. The above process may result in minor regions being identified for which it is unlikely that they correspond with an object on the person. The image may accordingly be cleaned up by dilating the highlighted spots and then deleting smaller regions not expected to be significant. Dilating is a process of expanding highlighted regions. One way of doing this is by passing another "window" of analysis or kernel over the image. For a given reference pixel, if there are more white pixels than a preset threshold, then the pixels in the entire window are made white. An exemplary result is shown as dilated image 184 in FIG. 14.

Figure 15:
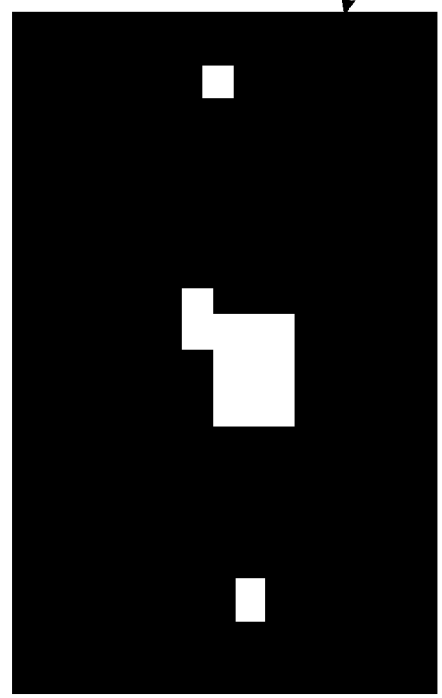
FIG. 15 is an image resulting from applying bounding rectangles to the highlighted areas of the image of FIG. 16.

To simplify the imaging of the suspected object areas, rectangles that bound the highlighted regions may be identified. FIG. 15 illustrates an image 186 that results from such a process. The rectangular regions are larger in size than the previously highlighted regions. Also, some regions may include more than one suspected area.

Figure 16:
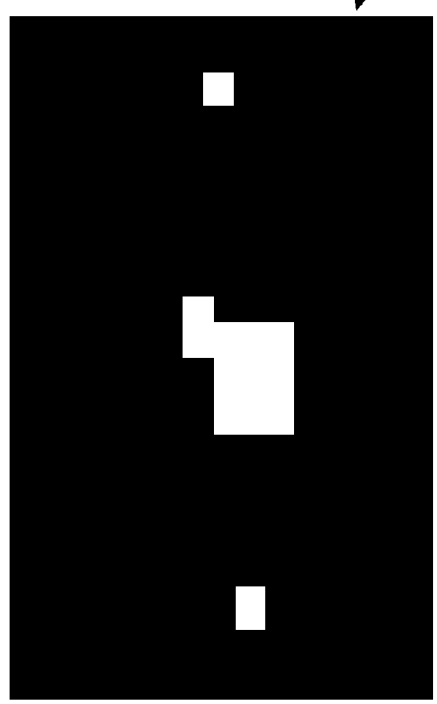
FIG. 16 is an image resulting from dilating the highlighted areas of the image of FIG. 17.

This image may again be dilated to further combine closely spaced areas. The image 188 that results from one such process is shown in FIG. 16. It is seen that in this case, the image of FIG. 16 is nearly the same as the image of FIG. 15. Different criteria for dilating may produce different results. This image may then be used to produce a final mask of the suspect areas.

Figure 17:
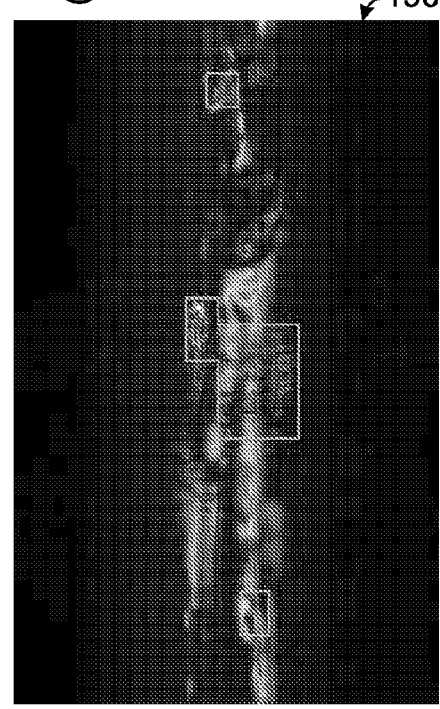
FIG. 17 is a copy of the original image of FIG. 8 superimposed with the outlines of the highlighted areas of FIG. 16, which correspond with suspect regions in the original image.

To facilitate the identification of objects on the subject image, the outlines of the suspect areas, derived from the image of FIG. 16, may be added to a display of the original image, as shown in FIG. 17. Image 190 shown in this figure is a reproduction of original image 160 shown in FIG. 8, with outlines of the suspect regions as defined by image 188. Optionally, as is shown in FIGS. 18 and 19 below, the portions of the original subject image within the suspect areas may be superimposed on a modified subject image, such as image 180 of FIG. 12, to preserve privacy concerns of a subject person.

As has been mentioned, a surveillance system 20 can be configured to provide both an image of a subject, as well as supplemental subject information. The source of supplemental subject information can be in the form of a sensor, such as a metal detector. As described with reference to the subject-information assembly 22 illustrated in FIGS. 5-7, metal can be detected in regions of the subject. These regions may be a plurality of vertically distributed zones, as may be provided by sensor apparatus 26" depicted in FIG. 7.

Figure 18:
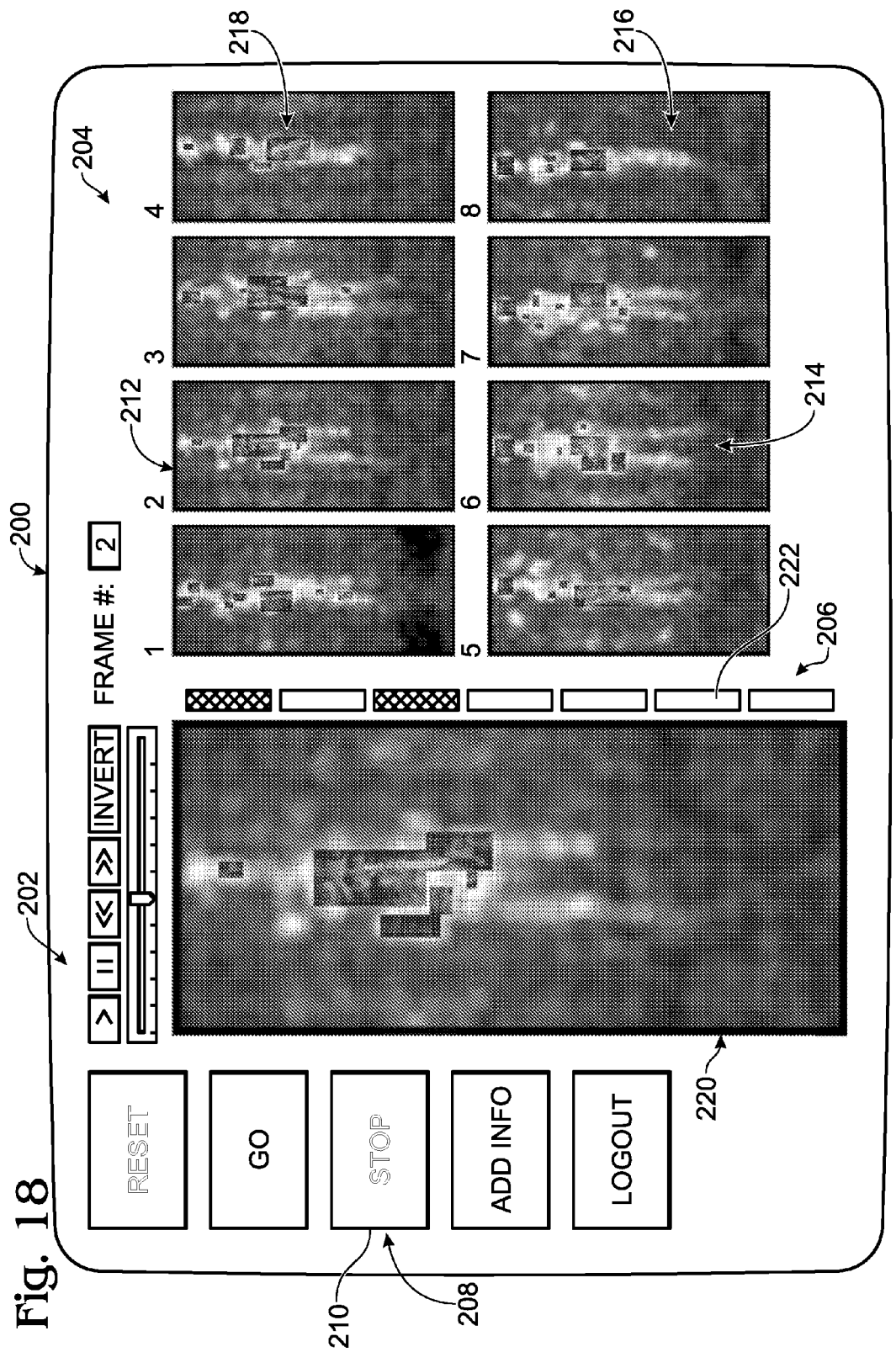
FIG. 18 is an exemplary display of a surveillance system having an imaging apparatus and a zonal metal detector, identifying various suspect regions of a subject and zones of the subject where metal is detected.
Figure 19:
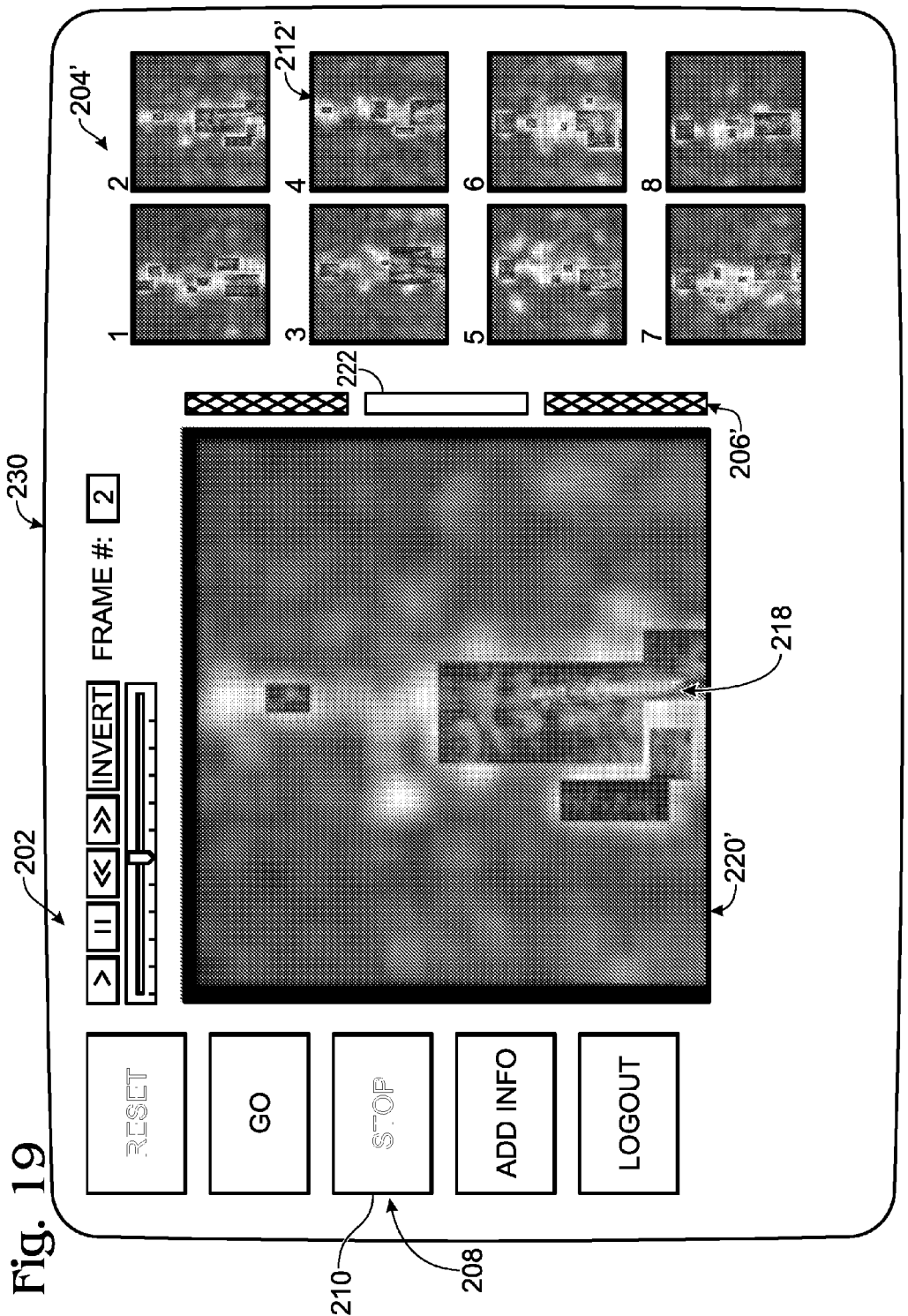
FIG. 19 is a display similar to FIG. 18 in which the subject images are cropped and a primary image is enlarged to show portions of the subject images having detected metal.

FIG. 18 illustrates a display 200 of an output device 132 of a surveillance system 20. Display 200 may be a computer-generated display of a control panel 202, displayed subject images 204, and a supplemental sensor output display 206. Control panel 202 may include a variety of display and system operation controls 208, such as control keys 210.

Various configurations of a subject image or images 204 can be provided. In this example, eight frames 212 of images corresponding to views of the subject at 45-degree increments around the subject are shown. Each frame includes a subject image 214, which in this instance is a privacy image 216 of the subject, such as provided by the process described with reference to FIGS. 8-17. Suspect regions 218 of the detailed subject image, such as regions identified by an object-identification algorithm, as discussed above, are super-imposed on the privacy images. A selected one of the eight frames is enlarged and displayed as a primary image 220. The enlarged frame includes enlargements of the suspect regions, making them easier to see by an operator.

Supplemental display 206 visually associates the results of operation of a second sensor apparatus 26. In this example, the second sensor apparatus may be a metal detector that determines the existence of metal in different vertical zones of the person's body. A display element 222 is aligned with each of the detected zones of the image 220. The display element in this case has a positive state, represented by a dark indication or distinctive color, when metal is detected in the corresponding zone of the subject. When no metal is detected for a particular zone, the display element has a negative state represented by a light indication or distinctive color. Other symbols, indicia or representations could be used to indicate the results of the second sensor apparatus relative to the subject image.

It is seen that for the selected primary image 220 shown in FIG. 18, suspect regions 218 exist in the pelvic, lower torso and head regions. The top and third down metal display elements 222 are shown to be in the positive state and the others are in the negative state, indicating that one or more of the objects identified in each of these two zones is or are made of metal. Based on this result, the surveilled person could be watched or apprehended, to prevent entry into an associated facility, or take any other action deemed appropriate in the circumstances.

When there is a match or correlation of detected information in a particular location or particular locations of a subject, one or more images may be further enlarged or cropped to focus attention on and provide additional detail of the suspect regions or zones where metal is detected. An additional display 230 that may be provided, is shown in FIG. 19. This display generally has the same features as display 200, and corresponding features are shown with a prime. The image frames 212' and primary image 220' are rearranged, enlarged, and/or cropped to show suspect regions 218, and eliminate continuous zones that do not have a suspect region or an indication of positive metal detection. The enlarged images, such as enlarged primary image 232, may be provided without further alteration, or may provide increased resolution. The image resolution can be increased by image-enhancement or editing software, as well as by rescanning the subject with the same array in a higher resolution mode, or with a finer-resolution array.

Although not shown in the figures, a surveillance system may also be adapted to provide images of regions of a subject for which no suspect regions are identified, but for which a supplemental sensor detects a substance or other characteristic. In the case where metal is detected in a zone for which no suspect regions are identified, an enlargement of the image of the affected zone provides improved resolution or detail, to show whether an external object is present in that zone.

Figure 20:
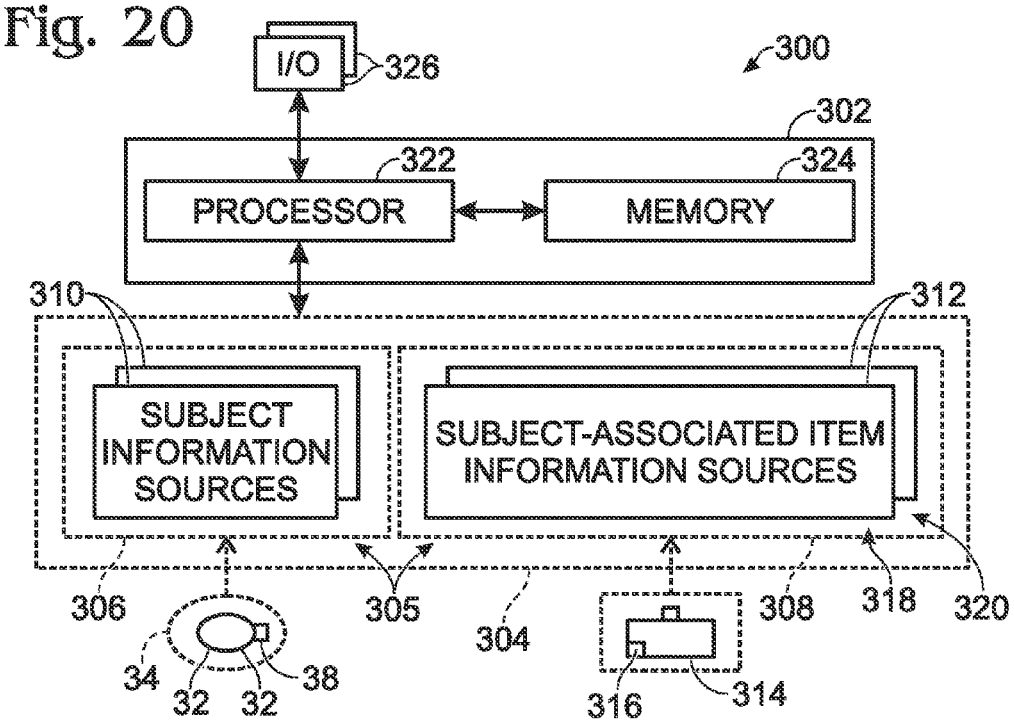
FIG. 20 is a block diagram depicting another example of a general surveillance system having a subject information source assembly and a subject-associated item information source assembly.

Another example of a general surveillance system is shown in FIG. 20 and is generally indicated at 300. Surveillance system 300 may include at least one controller 302 and a subject-related information assembly 304. "Subject-related information," as used herein, refers to information related to a subject and/or one or more subject-associated items. Unless otherwise indicated, surveillance system 300 may include one or more of the structures and/or functions of structures of general surveillance system 20 discussed above.

Subject-related information assembly 304 may include a subject information assembly 306 and a subject-associated item information assembly 308. The subject information assembly may include one or more of the structures and/or functions of structures of subject information assembly 22 discussed above. For example, subject information assembly 306 may include a plurality of subject information sources 310, which may at least partially include the structures and/or functions of the one or a plurality of screening apparatus 26 and/or the one or a plurality of supplemental subject information sources 30. The subject information sources may provide information related to subject 32 in subject position 34, such as information on person 36 and objects 38 with and/or supported on the person. Subject information sources 310 may be controllable or controlled by controller 302.

Subject-associated item information assembly 308 may include a plurality of subject-associated item information sources 312. The subject-associated item information sources may provide information related to one or more subject-associated items 314, such as any objects 316 carried by those items. "Subject-associated items," as used herein, refers to items associated with the subject but not part of the subject, such as divested objects, carryon baggage, and checked baggage. Subject-associated item information sources 312 may be controllable or controlled by controller 302.

The subject-associated item information sources may include at least one subject-associated item screening apparatus 318. Screening apparatus 318 may be configured to screen at least a portion or a plurality of sections of the one or more subject-associated items and/or produce screening data or a screening signal representative of screening the at least a portion of the one or more subject-associated items. In some embodiments, screening apparatus 318 may be adapted to detect a given characteristic (and/or object information) of an object potentially carried by one or more subject-associated items and to produce a screening signal representative of the detection of that characteristic (and/or screening data indicating the detection of the characteristic). In some embodiments, screening apparatus 318 may be adapted to produce object data indicative of whether the subject-associated item(s) carries at least one object that includes the object information or a screening signal representative of the detection of the given characteristic. The screening data may be received by controller 302 and/or other structures of surveillance system 300, as further discussed below.

In some embodiments, the subject-associated item screening apparatus may include at least one subject-associated item imaging apparatus 320, which may include any suitable structure adapted to image at least a portion of the subject-associated item(s) and/or to produce an image signal representative of an image of the at least a portion of the subject-associated item(s). For example, imaging apparatus 320 may be adapted to transmit, toward the one or more subject-associated items, X-ray electromagnetic radiation for use in X-ray transmission, diffraction, and/or backscattering imaging. In some examples, the X-ray radiation may be in a frequency range of about 30 Petahertz (PHz) to about 30,000 PHz, with corresponding wavelengths that may range from 10 to 0.01 nanometers. Examples of the use of X-ray electromagnetic radiation for screening subject-associated item(s) are further described in U.S. Pat. No. 5,600,303 to Husseiny et al., the complete disclosure of which is herein incorporated by reference for all purposes.

Imaging apparatus 320 may alternatively, or additionally, include other suitable imaging technologies such as computed tomography (CT), magnetic resonance imaging (MRI), smart X-ray, multi-view X-ray, laminography, and/or other technologies discussed above. Structures and features of some examples of imaging apparatus 320 are further described in U.S. Pat. No. 6,952,163 to Huey et al., the complete disclosure of which is herein incorporated by reference for all purposes. Although imaging apparatus 320 is discussed to incorporate or use particular technologies, the imaging apparatus may alternatively, or additionally, include one or more suitable technologies configured to image the contents of the subject-associated item(s).

Screening apparatus 318 may alternatively, or additionally, be adapted to detect, in the one or more subject-associated items, one or more of a metal substance, an explosive substance (such as Semtex, C-4, nitroglycerin, PETN, RDX, Detasheet, TNT, tetryl, ANFO, and black powder), a chemical substance (such as illegal drugs, including cocaine, heroin, and MDMA), and a feature identifying the person associated with the one or more subject-associated items (such as one or more tags attached to the item(s) and having a barcode, RFID, and/or image of the person). Screening apparatus 318 may include one or more suitable technologies. For example, in some embodiments where the subject-associated item screening apparatus is adapted to detect metal, explosive, and/or chemical substance(s), the screening apparatus may include X-ray transmission, diffraction, and/or backscatter, nuclear quadropole resonance (NQR), trace detection, and/or other suitable technologies. The use of X-ray diffraction, NQR, and trace detection in screening one or more subject-associated items are further discussed in U.S. Pat. No. 5,600,303 to Husseiny et al. and U.S. Pat. No. 6,952,163 to Huey et al. Additionally, or alternatively, in some embodiments where the subject-associated item screening apparatus is adapted to detect a feature identifying the person associated with the one or more subject-associated items, the screening apparatus may include barcode reader(s), RFID reader(s), video camera(s), and/or other suitable technologies.

Subject-associated item information sources 312 may additionally, or alternatively, include context data stored in a memory. Context data relates to potential objects carried by the one or more subject-associated items, such as historical data relating to information previously detected or input about the one or more subject-associated items and/or the person associated with those items, any clearance the person associated with the one or more subject-associated items might have to carry particular types of objects, and/or other data that may be considered to assist in detecting and assessing the significance of objects in the one or more subject-associated items. The context data may include results of previous screening(s) of a particular person and/or their subject-associated items within the particular facility or area in which the surveillance system is used in (which may be stored, for example, in memory associated with surveillance system 300) and/or from other facilities and areas that have screened the particular person and/or their subject-associated item(s). Additionally, or alternatively, context data may include information from various public sources, such as the FBI, National Crime Information Center (NCIC), State Department databases, IRS, Social Security Administration, state motor vehicle and corrections departments, credit bureaus, and/or bank records, and/or private sources, such as organizations that generate preferred passenger lists.

Although subject-associated item information sources 312 are shown to include screening apparatus 318 and context data, the information sources may additionally, or alternatively, include other types of information sources configured to provide information regarding potential objects 316 carried by the one or more subject-associated items.

Controller 302 may be adapted to operate or control operation of one or more subject information sources 310 and/or one or more subject-associated item information sources. For example, when one or more of those sources include an imaging apparatus and a screening apparatus, the controller may be adapted to produce, from an image signal of the imaging apparatus, image data representative of the image of at least a portion of a subject and/or subject-associated item(s) (and/or image data representative of detection of a characteristic of an object potentially carried by a subject and/or one or more subject-associated items). Additionally, or alternatively, the controller may be adapted to produce, from a screening signal of a screening apparatus, screening data representative of screening at least a portion of a subject and/or subject-associated item(s) (and/or screening data indicating detection of a characteristic of an object potentially carried by the subject and/or one or more subject associated items). Alternatively, as discussed above, the imaging apparatus may be configured to produce the image data and/or the screening apparatus may be configured to produce the screening data. Although controller 302 is described as being adapted to produce image data and screening data from an image signal and a screening signal, respectively, the controller may be adapted to produce data from any suitable signal or combination of signals.

Additionally, or alternatively, the controller may be adapted to relate a first screening data to a second screening data, and to produce, from the related first and second screening data, relational information data relating the first screening data and the second screening data. For example, the controller may be adapted to relate image data to other screening data, and to produce, from the related image data and screening data, relational information data relating the image data and the screening data. Although controller 302 is described as being adapted to relate image data to screening data, the controller may be adapted to relate any suitable combination of data and to produce relational information data relating the combination of data. For example, the controller may alternatively, or additionally, be adapted to relate context data to screening data, and to produce, from the related context data and screening data, relational information data relating the context data and the screening data.

Alternatively, or additionally, controller 302 may be adapted to receive data from one or more subject information sources and/or one or more subject-associated item information sources, and control one or more operating parameters of one or more other subject information sources and/or one or more other subject-associated information sources based, at least in part, on the received data. For example, the controller may be adapted to receive first screening data from a first screening apparatus and control a sensitivity level of one or more screening apparatus other than the first screening apparatus. Additionally, or alternatively, the controller may be adapted to select for screening one or more portions of the subject and/or the subject-associated item(s) (or one or more portions of at least one section of the subject and/or one or more subject-associated items) based, at least in part, on the first screening data.

For example, the controller may receive data from screening a subject-associated item indicating that negligible amounts of an explosive substance were contained in the subject-associated item. The controller may then increase sensitivity levels for the same explosive substance when screening the subject and/or other subject-associated items. Although controller 302 is discussed to be adapted to control sensitivity level(s) or portion(s) to be screened, the controller may be adapted to control any suitable operating parameter(s) of downstream information sources based, at least in part, on received data from one or more upstream information sources.

Alternatively, or additionally, controller 302 may be adapted to analyze screening data, receive information data related to the subject and/or one or more subject-associated items, and then reanalyze the screening data based, at least in part, on the information data, and in manner that is at least partially different from the first analysis of the screening data. The controller may, in analyzing the screening data, assign one or more of a relative weight, value, attribute, and relative indicator to an object potentially with a screened subject and/or in screened subject-associated item(s) based, at least in part, on the screening data. Controller 302 may, after obtaining the information data, reassign one or more of a relative weight, value, attribute, and relative indicator to the object potentially with the screened subject and/or in the screened subject-associated item(s) based, at least in part, on the obtained information data.

For example, the controller may analyze screening data from screening of a subject-associated item and conclude that a flammable substance found in the subject-associated item is a low threat. Controller 302 may then obtain information data regarding the person associated with the subject-associated item that identifies the person as a suspected terrorist. The controller may then reanalyze the screening data with, for example, a higher sensitivity level and conclude that the flammable substance is a higher threat based, at least in part, on the obtained information data.

Alternatively, or additionally, the controller may analyze first screening data from screening of a first subject-associated item and conclude that a first portion of a potentially dangerous device found in the subject-associated item is a low threat without a second portion. Controller 302 may then obtain second screening data from screening the subject and/or other subject-associated item(s) indicating the presence of the second portion of the device. The controller may then reanalyze the first screening data and conclude that the first portion of the device is a higher threat based, at least in part, on the presence of the second portion of the device.

Controller 302 may include at least some of the structures and/or functions of controller 21 discussed above. For example, controller 302 may include a processor 322, a memory 324, and input and/or output devices 326, which may include at least some of the structures described above for processor 40, memory 42, and input and/or output devices 44, respectively.

Figure 21:
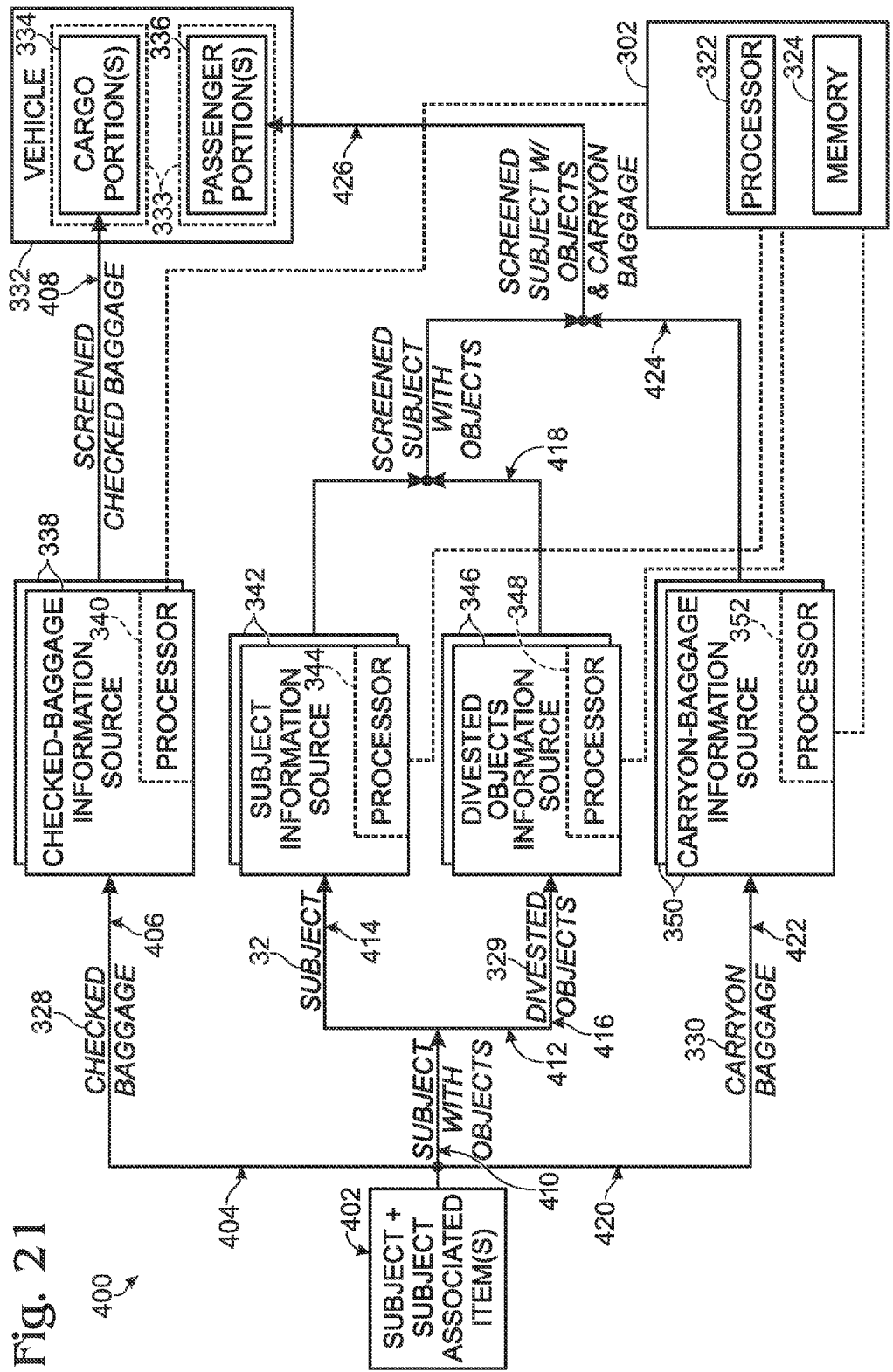
FIG. 21 is a general flow chart illustrating an example of a process of boarding a vehicle for a subject and subject-associated items and an example of how the surveillance system of FIG. 20 may be used with that process.

Subject information sources 310 and subject-associated item information sources 312 may be configured, distributed, and/or arranged in any suitable manner to obtain information on a subject and/or subject-associated items. For example, FIG. 21 shows an example of a process 400 of boarding a vehicle or conveyance at a vehicle facility (such as an airport, bus terminal, or train station) and how surveillance system 300 may be used to obtain information regarding subject 32 and subject-associated items 314 during that process. Subject-associated items 314 may include one or more checked baggage 328, one or more divested objects 329, and one or more carryon baggage 330. Process 400 involves boarding of subject 32 and subject-associated items 314 onto a vehicle 332 having one or more controlled-access areas 333, such as one or more cargo portions 334 and one or more passenger portions 336. When subject 32 is to be conveyed in a conveyance that includes a controlled-access area and in which the subject is traveling, the subject may be referred to as a "passenger." A controlled-access area may also be an area fixed in place, such as represented by a building or other facility.

The subject and the subject-associated items begin the process at 402. Checked baggage 328 may be physically separated from the subject at 404, may be screened by at least one checked-baggage information source 338 having a processor 340 at 406, and then may be moved to the cargo portion of the vehicle. The subject-associated items that are selected by the person to be moved to the cargo portion of the vehicle also may be referred to as "cargo-area items."

Subject 32 may be physically separated from the subject-associated items at 410 and then one or more objects 38 with or supported on person 36 may be physically separated from the subject at 412. Those objects may be referred to as "divested objects" when physically separate from the subject. The subject may be screened at 414 by at least one subject information source 342 having a processor 344. The divested objects may be screened by at least one divested object information source 346 having a processor 348 at 416. The screened divested objects may be returned to the screened subject or picked up by the screened subject at 418.

Carryon baggage 330 may be physically separated from the subject at 420 and may be screened by at least one canyon-baggage information source 350 having a processor 352 at 422. The screened carryon baggage may be returned to the screened subject at 424. The screened subject and the screened carryon baggage may then move to the passenger portion of the vehicle at 426. The subject-associated items and the divested objects that are selected by the person to be carried by the person into the passenger portion of the vehicle also may be referred to as "passenger-area items" or "carried items."

One or more of checked-baggage information source 338, subject information source 342, divested object information source 346, and carryon baggage information source 350 may be at least partially controlled by controller 302 having processor 322 and memory 324. Although those information sources are shown to each have its own processor, one or more of the information sources may not have a separate processor, but rather may share a processor, such as processor 322.

Additionally, or alternatively, at least one of the information sources may be used to screen two or more of the checked baggage, the subject, the divested objects, and the carryon baggage. For example, the at least one carryon baggage information source may be used to screen the carryon baggage and the divested objects. Alternatively, or additionally, the at least one subject information source may be used to screen the subject, the divested objects, and the carryon baggage.

Moreover, although surveillance system 300 is shown to have a particular configuration for obtaining information regarding a subject and/or subject-associated items that are boarding a vehicle with at least one cargo portion 334 and at least one passenger portion 336, the surveillance system may be configured in any suitable way as appropriate for the facility, the vehicle, threat level associated with the facility and/or the vehicle, and/or other suitable factors. An example of configuring the surveillance system would be to exclude one or more information sources shown in FIG. 21 or add one or more other suitable information sources. For example, the checked-baggage information source may be excluded if the vehicle includes only a passenger portion 336. Alternatively, the subject, divested object, and canyon-baggage information sources may be excluded if the vehicle includes only a cargo portion 334.

Furthermore, although surveillance system 300 is shown to be used in a vehicle facility, the general surveillance system may be configured for use in any type of facility. For example, surveillance system 300 may be used for an entrance of any type of building or facility having one or more controlled-access areas 333. When the general surveillance system is used in those applications, the system may exclude the at least one checked-baggage information source and/or other suitable information sources.

A flow chart 450 illustrating an example of a method of operation of surveillance system 300, is shown in FIG. 22. As discussed above, subject-related information assembly 304 may include one or more subject information sources 310 and one or more subject-associated item information sources 312. Data may be acquired from the subject information sources at 452, and then processed at 454. Similarly, data may be acquired from the subject-associated information sources at 456, and then processed at 458.

One or more of the subject information sources and/or the subject-associated item information sources may include an imaging apparatus that produces an image or image data representative of an image of at least a portion of the subject and/or the subject-associated item(s). The imaging apparatus may include apparatus that detects information relatable to zones, sections, portions, and/or positions of the subject and/or the subject-associated item(s), such as surfaces or characteristics, as may be realized, such as using received radiation of appropriate form, such as acoustical waves, optical radiation, infrared radiation, millimeter-wave radiation or other radio-frequency radiation, Terahertz radiation, and X-ray or Petahertz radiation. In some embodiments, the imaging apparatus may detect image information and produce a detected signal. Those signals may then be acquired and processed to construct image data.

Additionally, or alternatively, one or more of the subject information sources and/or the subject-associated item information sources may include non-imaging sources. A non-imaging source may be a sensor or screening apparatus that is configured to screen at least a portion of the subject and/or the subject-associated item(s), such as detecting general features of the subject and/or subject-associated item(s), such as a metal detector. The detection of the existence of a substance with the person and/or the subject-associated item(s), an identification of the person, a characteristic, class, or categorization of the person and/or the subject-associated item(s), and/or other appropriate indicators or information may be considered features of the subject and/or the subject-associated items. Alternatively, or additionally, the non-imaging source may be context data stored in memory relating to the subject and/or the subject-associated item(s).

The processed data from the subject information source(s) and the subject-associated information source(s) may then be used to identify features at 460. Those features may then be correlated with each other at 462. For example, the identification of an explosive substance on the person from a screening apparatus may be correlated with the detection of a triggering device in the person's carryon baggage and/or checked baggage.

The correlated features may then be classified at 464 based on the combination of features. As discussed above, classification of features is a logical process for determining the likelihood that a detected feature is a suspect object or a false alarm, and the process may use a relational database to relate the various possible features relating to a subject and/or subject-associated item(s) that are surveilled. Once the features are classified, then conclusions may be generated at 466 about the combination of features, and then outputted at 468. The outputs may be via display, report, and/or alarm condition. Additionally, or alternatively, the outputs may be used to control downstream information sources, reanalyze other screening data, and/or store data into memory. However, the steps discussed above may be performed in different sequences and in different combinations, not all steps being required for all embodiments of surveillance system 300.

A flow chart 500 illustrating another example of a method of operation of surveillance system 300, is shown in FIG. 23. Subject information data and/or subject-associated item information data from one or more upstream information sources 502 may be used to operate one or more downstream information sources of subject information data and/or subject-associated item information data. Data from the upstream information sources may be acquired at 504, and may be processed at 506.

The processed data from the upstream information source(s) may then be used to identify features at 508. Those features may be classified at 510 based on the above described logical process and/or other suitable logical process(es) for determining the likelihood that a detected feature is a suspect object or a false alarm. The identification of features and classification of features may be referred to as "analysis of the data." Once the features are classified, then conclusions may be generated at 512. Based, at least in part, on the generated conclusions, the controller may adjust the operation of one or more downstream information sources, such as adjusting a sensitivity level or adjusting which portion(s) of the subject and/or subject-associated item(s) to screen.

For example, a chemical substance may be detected in checked baggage screening apparatus but may be present in a negligible amount. The controller may increase the sensitivity level for the same chemical substance in the subject and/or carryon baggage screening apparatus based, at least in part, on detecting the chemical substance in the checked baggage. Additional negligible amounts in the subject and/or the carryon baggage, combined with the amount in the checked baggage, may cumulatively be non-negligible. However, the steps discussed above may be performed in different sequences and in different combinations, not all steps being required for all embodiments of surveillance system 300.

Figure 24:
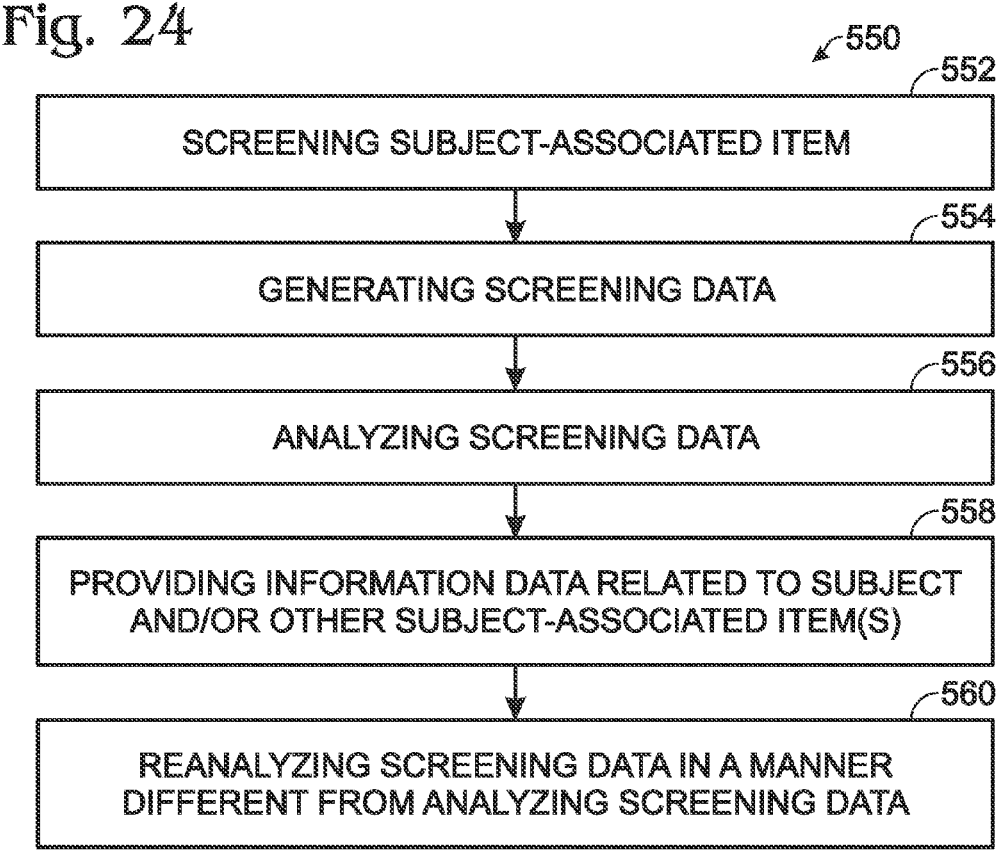
FIG. 24 is a general flow chart illustrating another example of a method of operation of the surveillance system of FIG. 20.

A flow chart 550 illustrating another example of a method of operation of surveillance system 300, is shown in FIG. 24. Under the method, one or more subject-associated items 314 may be screened at 552 via, for example, at least one screening apparatus 26. The screening may include detecting object information about an object potentially in the screened subject-associated item(s). The screening may include imaging at least a portion of the subject-associated item. Alternatively, or additionally, the screening may include detecting, in the subject-associated item(s), one or more of a metal substance, an explosive substance, a chemical substance, and a feature identifying the person associated with the subject-associated item.

Screening data may then be generated based, at least in part, on screening at least a portion of the subject-associated item at 554. The screening data may include, at least in part, the object information detected. The generated screening data may be analyzed, for example by the controller, at 556. Analyzing the screening data may include assigning a relative weight, value, attribute, and/or relative indicator to the object potentially in the screened subject-associated item based, at least in part, on the screening data. For example, a relative threat level (such as low risk, medium risk, or high risk) may be assigned to the object potentially in the screened subject-associated item.

After analyzing the screening data, information data related to the subject and/or one or more subject-associated items other than the screened subject-associated item may be obtained at 558. Obtaining information data may include screening at least a portion of the subject and/or the subject-associated item(s) other than the screened subject-associated item. That screening may include imaging at least a portion of the subject and/or the subject-associated item(s) other than the screened subject-associated item. Alternatively, or additionally, the screening may include detecting, in the subject and/or the subject-associated item(s) other than the screened subject-associated item, one or more of a metal substance, an explosive substance, a chemical substance, and a feature identifying the person associated with the subject-associated item. Alternatively, or additionally, the information data may include context data relating to the person and/or one or more subject-associated items associated with the person, other than the screened subject-associated item.

After obtaining the information data, the screening data may be reanalyzed at 560. The reanalysis may be based, at least in part, on the obtained information data, and may be in a manner that is at least partially different from the analysis of the screening data. Reanalyzing the screening data may include assigning a relative weight, value, attribute, and/or relative indicator to the object potentially in the screened subject-associated item based, at least in part, on the obtained information data. The relative weight, value, attribute, and/or relative indicator assigned from the reanalysis may be the same, lower, or higher than the relative weight, value, attribute, and/or relative indicator assigned from the analysis. For example, a knife potentially in the screened subject-associated item that was initially assigned a high threat level may be reassigned a lower threat level based, at least in part, on obtained information data that the person sells knives and has the appropriate approval to carry the knife in the screened subject-associated item. However, the steps discussed above may be performed in different sequences and in different combinations, not all steps being required for all embodiments of surveillance system 300.

A flow chart 600 illustrating another example of a method of operation of surveillance system 300, is shown in FIG. 25. Under the method, subject 32 may be screened at 602 via, for example, at least one screening apparatus 26. The screening may include detecting object information about an object potentially with or carried by the screened subject. The screening may include imaging at least a portion of the subject. Alternatively, or additionally, the screening may include detecting, in the subject, one or more of a metal substance, an explosive substance, a chemical substance, and a feature identifying the person.

Screening data may then be generated based, at least in part, on screening at least a portion of the subject at 604. The screening data may include, at least in part, the object information detected. The generated screening data may be analyzed, for example by the controller, at 606. Analyzing the screening data may include assigning a relative weight, value, attribute, and/or relative indicator to the object potentially with the screened subject based, at least in part, on the screening data. For example, a relative threat level (such as low risk, medium risk, or high risk) may be assigned to the object with the screened subject.

After analyzing the screening data, information data related to the subject and/or one or more subject-associated items may be obtained at 608. Obtaining information data may include screening at least a portion of the subject-associated item(s). That screening may include imaging at least a portion of the subject-associated item(s). Alternatively, or additionally, the screening may include detecting, in the subject-associated item(s), one or more of a metal substance, an explosive substance, a chemical substance, and a feature identifying the person associated with the subject-associated item. Alternatively, or additionally, the information data may include context data relating to the person and/or one or more subject-associated items associated with the person, other than the screened subject-associated item.

After obtaining the information data, the screening data may be reanalyzed at 610. The reanalysis may be based, at least in part, on the obtained information data, and may be in a manner that is at least partially different from the analysis of the screening data. Reanalyzing the screening data may include assigning a relative weight, value, attribute, and/or relative indicator to the object potentially in the screened subject-associated item based, at least in part, on the obtained information data. The relative weight, value, attribute, and/or relative indicator assigned from the reanalysis may be the same, lower, or higher than the relative weight, value, attribute, and/or relative indicator assigned from the analysis. For example, a gun potentially in the screened subject that was initially assigned a high threat level may be reassigned a lower threat level based, at least in part, on obtained information data that identified the person as a police officer. However, the steps discussed above may be performed in different sequences and in different combinations, not all steps being required for all embodiments of surveillance system 300.

As shown in FIG. 21, some embodiments of surveillance system 300 may require physical separation of the subject from subject-associated item(s), screening of the subject, and/or subject-associated items while physically separate from each other, and returning those item(s) to the subject. Surveillance system 300 may include any suitable structure configured to associate the subject and the subject-associated items, which may ensure proper return of those item(s) to the subject.

Figure 26:
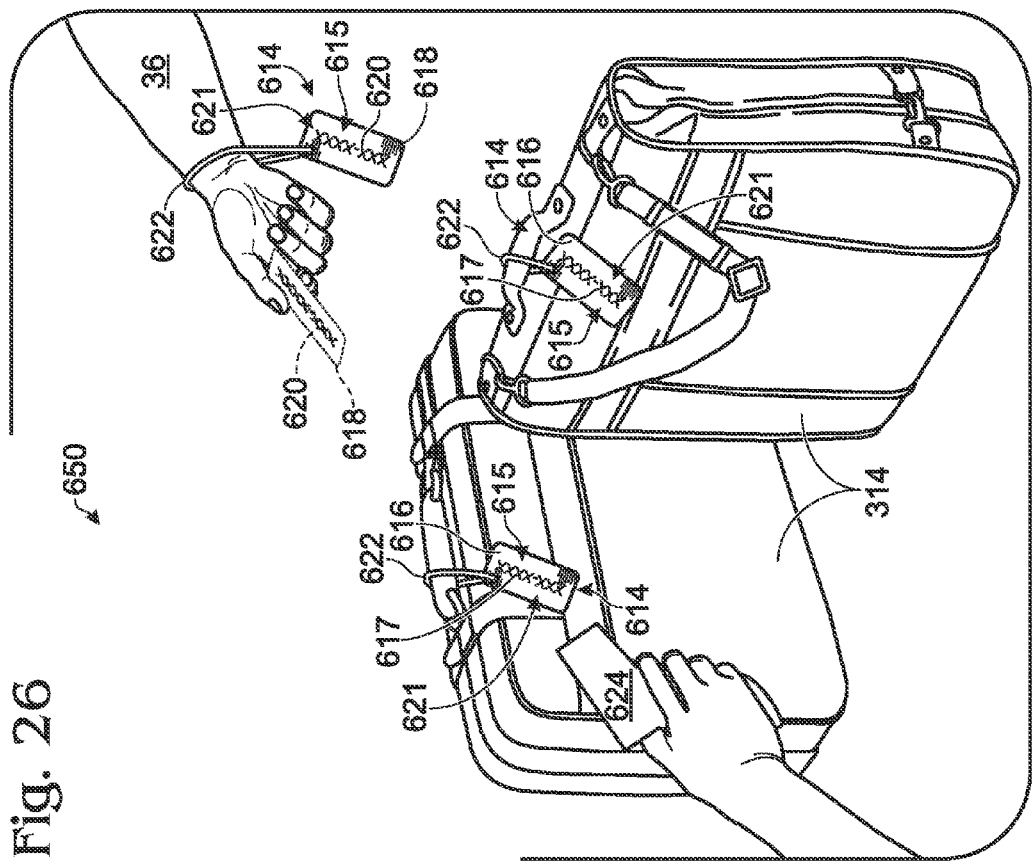
FIG. 26 is a general diagram showing an example of a system of associating a subject with carried items using the surveillance system of FIG. 20.
Figure 27:
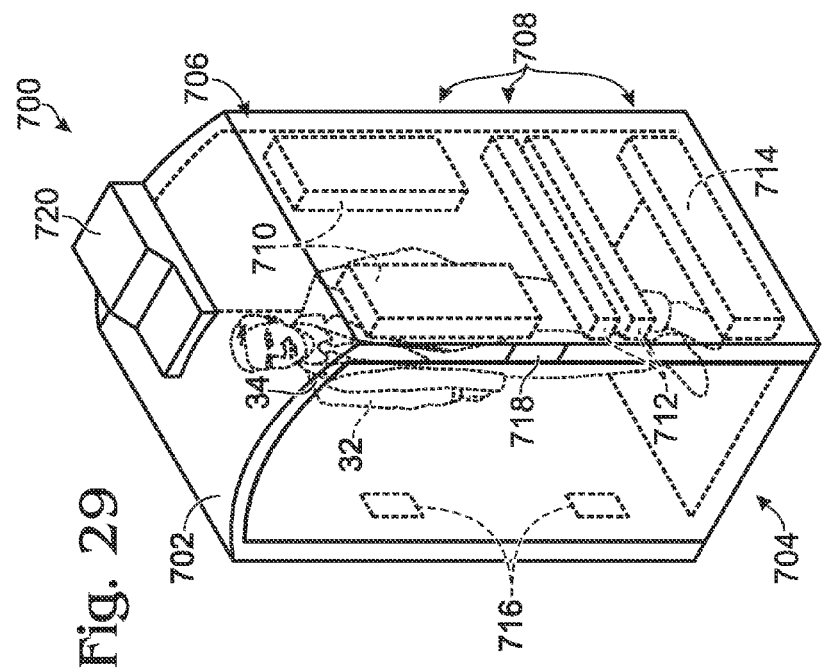
FIG. 27 is a general diagram showing another example of a system of associating a subject with carried items using the surveillance system of FIG. 20.

For example, as shown in FIGS. 26-27, surveillance system 300 may include a plurality of tags 614 having at least one identifier 615. The tags may be made from any suitable material(s), such as plastic, paper, leather, and/or metal. Tags 614 may include subject-associated item tags 616 having at least one subject-associated item identifier 617, and subject tags 618 having at least one subject identifier 620. In some embodiments of surveillance system 300, tags 614 may include only subject tags 614 or only subject-associated item tags 616.

Identifiers 615 may include any suitable identifier(s), such as one or more of an image of the subject, a barcode, a code contained in an RFID tag, a color, and an alphanumeric code. Where the tag is a RFID tag, the tag may be adapted to produce an identifying signal, such as when read by a RFID reader or RFID reading device. In some embodiments, the RFID tag may include a memory 621 with the identifier stored in the memory. Although particular identifiers 615 are discussed, any suitable identifier(s) may alternatively, or additionally, be used.

As discussed, tags 614 also may include at least one attachment assembly 622. The attachment assembly may include any suitable assembly configured to secure the tag to subject 32 and/or the subject-associated items 314, such as one or more of ropes, cords, lanyards, pins, chains, etc. In some embodiment of tags 614, the attachment assembly may be excluded. Although tags 614 are shown to be used to associate a person with their subject-associated item(s), any suitable structure(s) may alternatively, or additionally, be used, such as sticker(s), marker(s), etc.

One or more subject-related information sources 305 of surveillance system 300 may include at least one reader 624 configured to read identifiers 620 of tags 614. For example, where the identifier includes a barcode, then reader 624 may include a barcode reader or barcode reading device. Additionally, or alternatively, where the identifier includes an RFID device, then reader 624 may include an RFID reader. The barcode and/or RFID reader(s) may be connected and/or in communication with controller 302. The processor of the controller may associate the identifiers and/or perform other suitable functions. Additionally, the memory of the controller may store the associations performed by the processor.

Additionally, or alternatively, surveillance system 300 may include one or more containers 626 configured to contain subject-associated item(s), as shown in FIG. 27. The containers may include at least one base 628 having at least one container identifier 630, which may include any suitable identifier(s), such as one or more of an image of the subject, a barcode, an RFID device, a color, and an alphanumeric code. Additionally, identifier 630 may be read by reader 624. In some embodiments, containers 630 also may include a cover 632 and a locking mechanism 634 configured to secure the cover to the base. The locking mechanism may include any suitable mechanisms, including a mechanical key mechanism, a card reader, etc. Although containers 626 are shown to be used to associate the person and their subject-associated item(s), any suitable structure(s) may alternatively, or additionally, be used. For example, a compartmentalized conveyor with identifier(s) for each compartment may be used.

Figure 28:
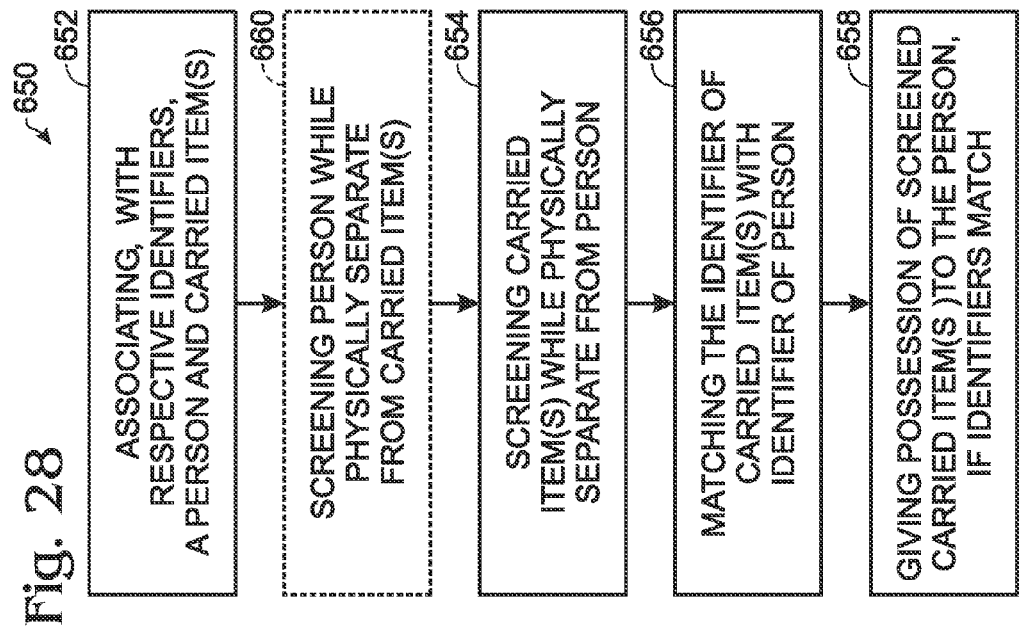
FIG. 28 is a general flow chart illustrating an example of a method of associating a subject with carried items using the surveillance system of FIG. 20.

A flow chart 650 illustrating an example of a method of operation of surveillance system 300 related to associating the person and the one or more subject-associated items, such as carried items, is shown in FIG. 28. A person and one or more carried items selected by the person to be carried by the person into a controlled access area may be associated with respective identifiers at 652. The carried item(s) may then be screened while physically separated from the person at 654. The identifier(s) of the carried item(s) may then be matched with the identifier(s) of the person at 656. If the identifiers match, then possession of the screened carried item(s) may be given to the person at 658. In some embodiments, the person also may be screened while physically separated from the carried item(s) at 660. However, the steps discussed above may be performed in different sequences and in different combinations, not all steps being required for all embodiments of surveillance system 300. Although the method is directed to associating the person and the carried items of the person, the method may be applied to associating the person with any subject-associated item or any combination of subject-associated items that are physically separated from the person.

Various embodiments of the method shown in flow chart 650 are possible, such as (a) carried item tag method, (b) carried item tag and subject tag method, (c) container method, (d) container and subject tag method. In the carried item tag method, one or more subject-associated item tags 616 having subject-associated item identifier(s) 617 may be attached (or be required to be attached) to the carried item(s) as part of associating at 652. As discussed above, the subject-associated item identifiers may be one or more of an image of the person, a barcode, an RFID device, a color, an alphanumeric code, and/or other suitable identifiers.

Where the subject-associated item identifier is an image of the person, associating at 652 also may include producing the at least one subject-associated item tag with an image of the person (such as from an image taken of the person at a surveillance portal) and associating that tag with the one or more carried items. Matching identifiers at 656 may then include comparing the image of the person on the at least one subject-associated item tag to a visual appearance of the person. Where the tag is a RFID tag having memory 621, associating at 652 also may include storing an identifier of the person, such as a name of the person and/or other suitable identifiers, in the memory. Matching identifiers at 656 may then include reading memory 621 with a reading device and comparing the read identifier of the person with a document that identifies the person, such as an identity card and/or boarding pass.

Where the subject-associated item identifier is at least one barcode, associating at 652 also may include reading the barcode with a reading device and associating an identifier of the person with the barcode. Matching identifiers at 656 may then include reading the barcode with the reading device and comparing the identifier of the person associated with the barcode with a document that identifies the person.

The carried item tag and subject tag method, similar to the carried item tag method, also includes attaching or requiring attachment of at least one subject-associated item tag 616 having at least one subject-associated item identifier 617 (such as one or more of a barcode, an RFID device, a color, and an alphanumeric code) as part of associating at 652. However, unlike the previously discussed method, associating at 652 also includes providing, to the person, at least one subject tag 618 having at least one subject identifier 620 (such as one or more of a barcode, an RFID device, a color, and an alphanumeric code), reading the subject-associated item identifier(s) and the subject identifier(s), and associating or relating those two types of identifiers. For example, where subject-associated item identifier 617 and subject identifier 620 include barcodes, associating at 652 may include reading the barcodes with a reading device and associating the barcodes with each other.

Matching at 656 may then include reading the subject-associated item identifier(s) and the subject identifier(s), and confirming that the subject-associated item identifier(s) is associated with the subject identifier(s). In the example above where barcodes are used for identifiers, matching at 656 may include reading the barcodes with a reading device and confirming that the barcodes are associated.

In the container method, associating at 652 may include placing or requiring placement of the carried item(s) in one or more containers 626 having at least one container identifier 630. As discussed above, container identifier 630 may include one or more of an image of the person, a barcode, an RFID device, a color, and an alphanumeric code. Where the container identifier is an image of the person, associating at 652 also may include placing the image of the person on the container. Matching identifiers at 656 may then include comparing the image of the person on the container to a visual appearance of the person.

Where the container identifier includes an RFID tag having memory 621, associating at 652 also may include storing an identifier of the person, such as a name of the person and/or other suitable identifiers, in the memory. Matching identifiers at 656 may then include reading memory 621 with a reading device and comparing the read identifier of the person with a document that identifies the person, such as an identity card and/or boarding pass. Where the container identifier is at least one barcode, associating at 652 also may include reading the barcode with a reading device and associating an identifier of the person with the barcode. Matching identifiers at 656 may then include reading the barcode with the reading device and comparing the identifier of the person associated with the barcode with a document that identifies the person.

In some embodiments where container 626 includes cover 632 and locking mechanism 634 configured to secure the cover, associating at 652 also may include securing the cover, such as when the carried items are in the container and the container identifier has been associated with an identifier of the person. Additionally, matching identifiers at 656 also may include opening the cover to allow removal of the carried item(s) from the container, such as when the container identifier and identifier of the person match.

The container and subject tag method, similar to the container method, may also include placing or requiring placement of the carried item(s) in one or more containers 626 having at least one container identifier 630 (such as one or more of a barcode, a RFID device, a color, and an alphanumeric code) as part of associating at 652. However, unlike the previously discussed method, associating at 652 may also include providing, to the person, at least one subject tag 618 having at least one subject identifier 620 (such as one or more of a barcode, an RFID device, a color, and an alphanumeric code), reading the container identifier(s) and the subject identifier(s), and associating or relating those two types of identifiers. For example, where container identifier 617 and subject identifier 620 include barcodes, associating at 652 may include reading the barcodes with a reading device and associating the barcodes with each other.

Matching at 656 may then include reading the container identifier(s) and the subject identifier(s), and confirming that the container identifier(s) is associated with the subject identifier(s). In the example above where barcodes are used for identifiers, matching at 656 may include reading the barcodes with a reading device and confirming that the barcodes are associated.

In some embodiments where container 626 includes cover 632 and a locking mechanism to secure the cover, associating at 652 also may include securing the cover, such as when the carried items are in the container and the container identifier has been associated with an identifier of the person. Additionally, matching identifiers at 656 also may include opening the cover to allow removal of the carried item(s) from the container, such as when the container identifier and identifier of the person match. Although particular methods are discussed, any suitable method(s) may be used to associate the subject and the one or more subject-associated items, such as carried items. For example, the at least one identifier of the subject-associated item tag(s) may be associated with at least one identifier of the person's ticket and/or boarding pass (such as a barcode of the subject-associated item and a barcode of the person's boarding pass).

Figure 29:
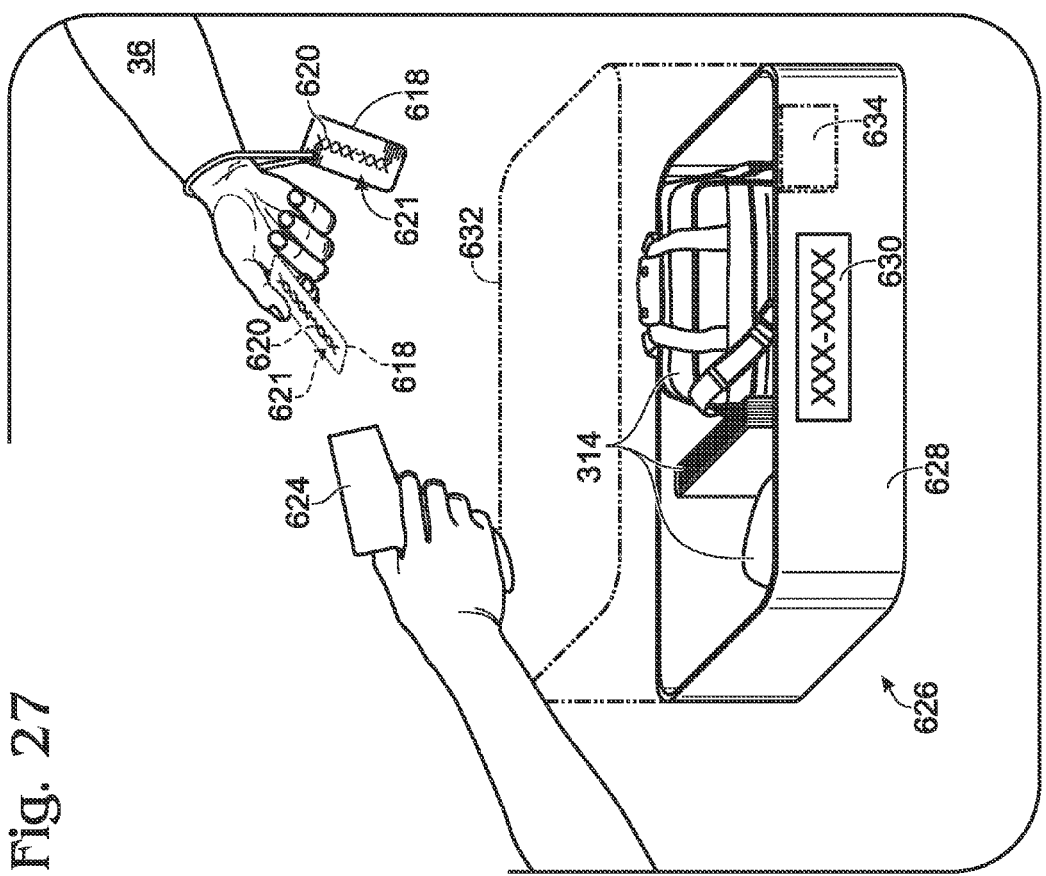
FIG. 29 is a general diagram showing an example of a subject information assembly usable in the surveillance system of FIG. 20, and having multiple screening apparatus.

An example of surveillance system 300 having a subject information assembly 306 mounted in a surveillance station or portal 700 is shown in FIG. 29. Unless otherwise specified, surveillance portal 700 may include at least some of the structures and/or functions of structures of surveillance portal 100 described above. The surveillance portal may include an enclosure 702 and a plurality of screening apparatus 704. The enclosure may at least substantially enclose subject 32 in subject position 34 and may include an entrance 704 and an exit 706. The entrance and/or exit may be controlled barriers and may be controlled by controller 302. For example, controller 302 may open the entrance and/or exit only when screening apparatus 704 have completed screening the subject.

Although enclosure 702 is shown to have entrance 704 and exit 706, the enclosure may alternatively have a single opening that serves as the entrance and the exit. Additionally, although enclosure 702 is shown to completely enclose subject 32, the enclosure may less than completely enclose the subject. For example, the enclosure may exclude a top or ceiling and/or may exclude a bottom or floor.

The plurality of screening apparatus may be adapted to detect on subject 32 in subject position 34 one or more characteristics of at least one object potentially carried by the subject and/or the subject-associated item(s). For example, the plurality of screening apparatus may include a millimeter wave imaging apparatus 710, a nuclear detection apparatus 712, a biochemical detection apparatus 714, trace element detection apparatus 716, a proximity card reader 718, and a subject recognition apparatus 720.

Nuclear detection apparatus 712 may include any suitable structure adapted to detect the presence of one or more radioactive materials in the subject and/or the subject-associated item(s). Examples of nuclear detection apparatus are provided in U.S. Pat. Nos. 7,142,625 to Jones et al. and 5,371,362 to Mestais et al., the complete disclosures of which are herein incorporated by reference for all purposes. Biochemical detection apparatus 714 may include any suitable structure adapted to detect the presence of one or more biological and/or chemical substances, such as biological and chemical warfare agents. The biochemical detection apparatus may include immunoassay systems, polymerase chain reaction units, liquid-phase systems, gas-phase systems, flame spectrophotometry, infrared spectroscopy, and laser techniques. Other examples of biochemical detection and/or nuclear detection apparatus are provided in U.S. Pat. Nos. 7,088,230; 7,084,753; and 7,061,388 to Maurer et al., the complete disclosures of which are herein incorporated by reference for all purposes.

Trace element detection apparatus 716 may include any suitable structure adapted to detect the presence of one or more substances in the subject and/or the subject-associated item(s). The trace element detection may be based on one or more technologies discussed above. Proximity card reader 718 may include any suitable structure adapted to read and/or identify one or more items, such as a boarding pass, an identity card, etc. The proximity card reader may include one or more barcode readers, radio frequency identification (RFID) readers, and smart card readers. Although proximity card reader 714 is included with portal 700, the portal may alternatively, or additionally, include other types of card readers, such as magnetic stripe readers, etc.

Person recognition apparatus 720 may include any suitable structure configured to identify the person in the portal. For example, the person recognition apparatus may include any suitable technologies for face imaging, retinal imaging, fingerprint and/or other biometric identification of the person. Additionally, or alternatively, person recognition apparatus 720 may include a video camera, and/or other suitable camera.

Although portal 700 is shown to have specific types of screening apparatus, the portal may have any suitable type(s) of screening apparatus adapted to screen the subject in the subject position. Additionally, although portal 700 is shown to include six types of screening apparatus, the portal may have any suitable number of screening apparatus. Moreover, although portal 700 is shown to include the subject information assembly, the portal may additionally, or alternatively, include the subject-associated item information assembly.

While the inventions defined in the following claims have been particularly shown and described with reference to the foregoing embodiments, those skilled in the art will understand that many variations may be made therein without departing from the spirit and scope of the inventions. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The foregoing embodiments are illustrative, and no single feature or element is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second, and third, for identified elements are used to distinguish between the elements, and do not indicate a required or limited number of such elements, nor does it indicate a particular position or order of such elements unless otherwise specifically stated.

INDUSTRIAL APPLICABILITY

The methods and apparatus described in the present disclosure are applicable to security, monitoring and other industries in which surveillance and imaging systems are utilized.

What is claimed is:

1. A surveillance system, comprising:
a first screening apparatus configured to transmit toward and receive from a subject in a subject position, first electromagnetic radiation in a frequency range of about 100 MHz to about 2 THz, from positions spaced from the subject position, the subject including at least a portion of a person in a subject position and detectable objects carried by the person, the first screening apparatus configured to produce from the received radiation, a first image signal representative of a first image of at least a portion of the subject;
a second screening apparatus different than the first screening apparatus, and configured to detect from at least one subject-associated item a given characteristic of an object potentially carried by the subject or the at least one subject-associated item, and to produce a screening signal representative of the detection of the given characteristic; and
a controller apparatus configured to control operation of the first and second screening apparatuses; to produce, from the image signal, image data representative of the image of the at least a portion of the subject and screening data from the screening signal; to relate the image data to the screening data; to produce from the related image data and screening data, relational information data about whether at least one of (a) the person and (b) the at least one subject-associated item is potentially carrying an object having the given characteristic; to generate conclusions based on the produced relational information data; and to output the generated conclusions.

2. The system of claim 1, in which the second screening apparatus includes an imaging apparatus configured to transmit, toward the at least one subject-associated item, electromagnetic radiation in a frequency range of about 30 PHz to about 30,000 PHz.

3. The system of claim 1, in which the second screening apparatus is further adapted to detect, in the at least one subject-associated item, one or more of a metal substance, an explosive substance, a chemical substance, and a feature identifying the person associated with the at least one subject-associated item.

4. The system of claim 1, in which the second screening apparatus is a non-imaging source of information for the at least one subject-associated item.

5. A surveillance system, comprising:
a first screening apparatus configured to detect on a subject in a subject position a first characteristic of an object potentially carried by at least one of (a) the subject and (b) one or more subject-associated items, and to produce a first screening signal representative of the detection of the first characteristic, the subject including a person and any objects with the person;
a second screening apparatus that is different from the first screening apparatus and is configured to detect from the subject in the subject position a second characteristic of an object potentially carried by at least one of (a) the subject and (b) the one or more subject-associated items, and to produce a second screening signal indicating the detection of the second characteristic; and
a controller apparatuses; configured to control operation of the first and second screening apparatus, to produce first screening data indicating the detection of the first characteristic from the first screening signal, and second screening data indicating the detection of the second characteristic from the second screening signal; to relate the first screening data to the second screening data; to produce from the related first and second screening data, relational information data about whether at least one of (a) the subject and (b) the one or more subject-associated items is potentially carrying an object having at least one of the first and second characteristics; to generate conclusions based on the produced relational information data; and to output the generated conclusions.

6. The system of claim 5, in which the first screening apparatus includes a first imaging apparatus adapted to detect a first characteristic of an object potentially carried by at least one of (a) the subject and (b) the one or more subject-associated items, and to produce a first imaging signal representative of the detection of the first characteristic, and the controller apparatus is further adapted to produce first imaging data from the first imaging signal and second screening data from the second screening signal, to relate the first imaging signal to the second screening signal, and to produce, from the related first imaging data and second screening data, relational information data about whether at least one of (a) the subject and (b) the one or more subject-associated items is potentially carrying an object having at least one of the first and second characteristics.

7. The system of claim 6, in which the first imaging apparatus is further adapted to transmit toward and receive, from the subject in a subject position, electromagnetic radiation in a frequency range of about 100 MHz to about 2 THz, from positions spaced from the subject position.

8. The system of claim 6, in which the first imaging apparatus is further adapted to transmit, toward the one or more subject-associated items, electromagnetic radiation in a frequency range of about 30 PHz to about 30,000 PHz.

9. The system of claim 6, in which the second screening apparatus includes a second imaging apparatus adapted to detect a second characteristic of an object potentially carried by at least one of (a) the subject and (b) the one or more subject-associated items, and to produce a second imaging signal representative of the detection of the second characteristic, and the controller apparatus is further adapted to produce first imaging data from the first imaging signal and second imaging data from the second imaging signal, to relate the first imaging signal to the second imaging signal, and to produce, from the related first imaging data and second imaging data, relational information data about whether at least of (a) the subject and (b) the one or more subject-associated items is potentially carrying an object having at least one of the first and second characteristics.

10. The system of claim 9, in which the second imaging apparatus is further adapted to transmit toward and receive, from the subject in a subject position, electromagnetic radiation in a frequency range of about 100 MHz to about 2 THz, from positions spaced from the subject position.

11. The system of claim 9, in which the second imaging apparatus is further adapted to transmit, toward the one or more subject-associated items, electromagnetic radiation in a frequency range of about 30 PHz to about 30,000 PHz.

12. The system of claim 5, in which first screening apparatus is further adapted to detect, in at least one of (a) the subject and (b) the one or more subject-associated items, one or more of a metal substance, an explosive substance, a chemical substance, and a feature identifying the subject.

13. The system of claim 12, in which second screening apparatus is further adapted to detect, in at least one of (a) the subject and (b) the one or more subject-associated items, one or more of a metal substance, an explosive substance, a chemical substance, and a feature identifying the subject.

14. The system of claim 5, in which the second screening apparatus is a non-imaging source of information for the subject.

* * * * *